June 8, 1971   F. L. CALIFANO ET AL   3,583,889
APPARATUS FOR THE PRODUCTION OF ADHESIVE-BACKED TILE PRODUCTS
Filed Feb. 18, 1966   20 Sheets-Sheet 1
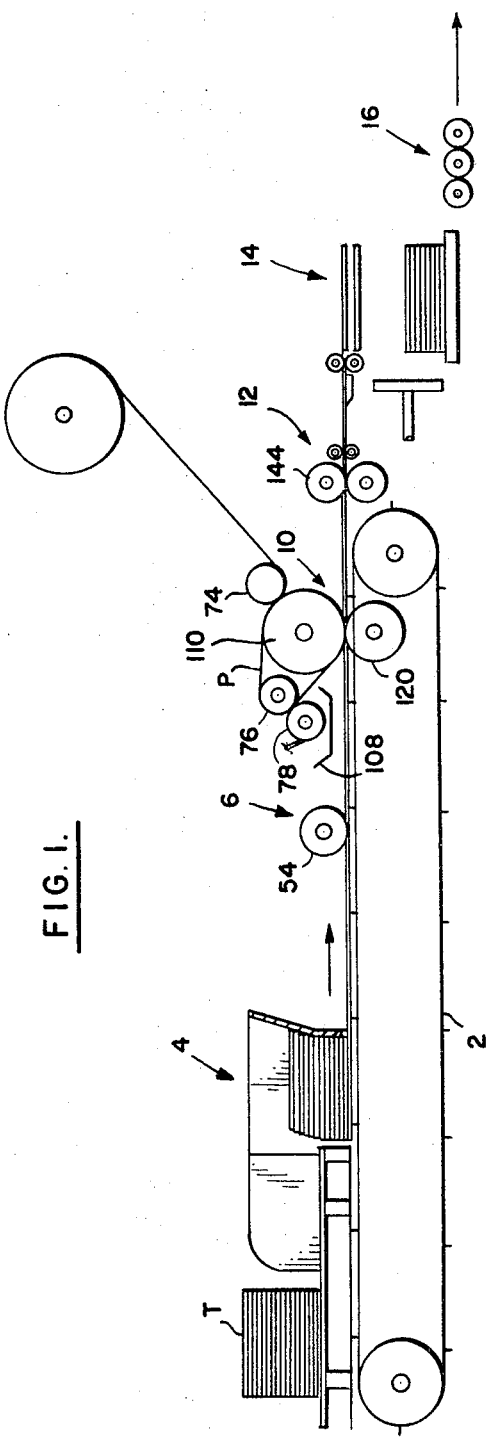
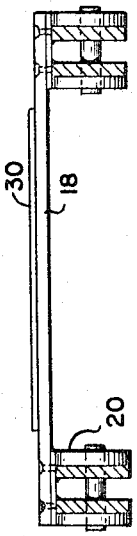
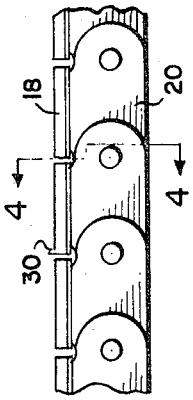
INVENTORS
FRANK L. CALIFANO
JOSEPH LASZLO
BY
*Julian L. Tomaselli*
ATTORNEY INVENTORS
FRANK L. CALIFANO
JOSEPH LASZLO
BY
*Julius L. Tomaselli*
ATTORNEY

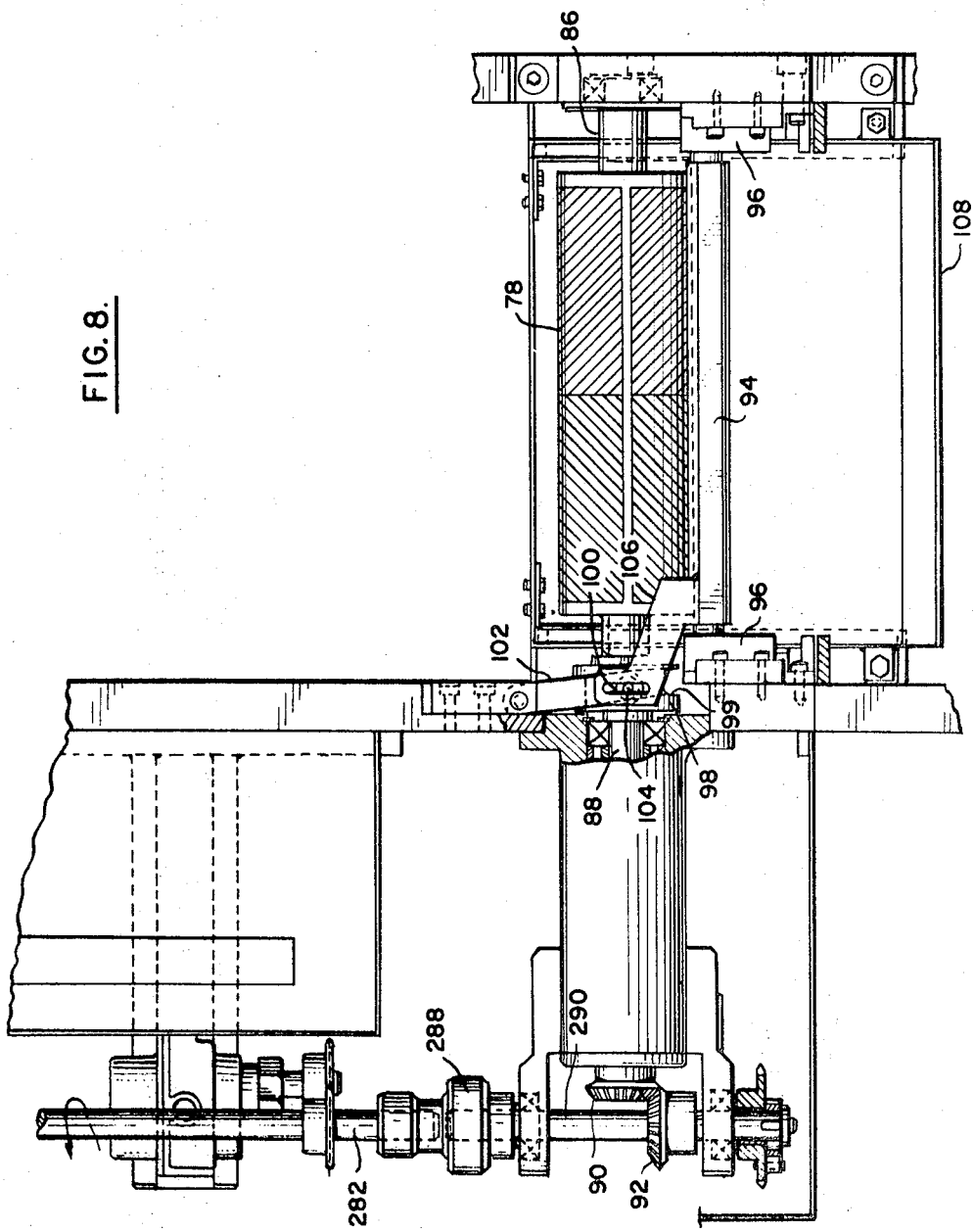

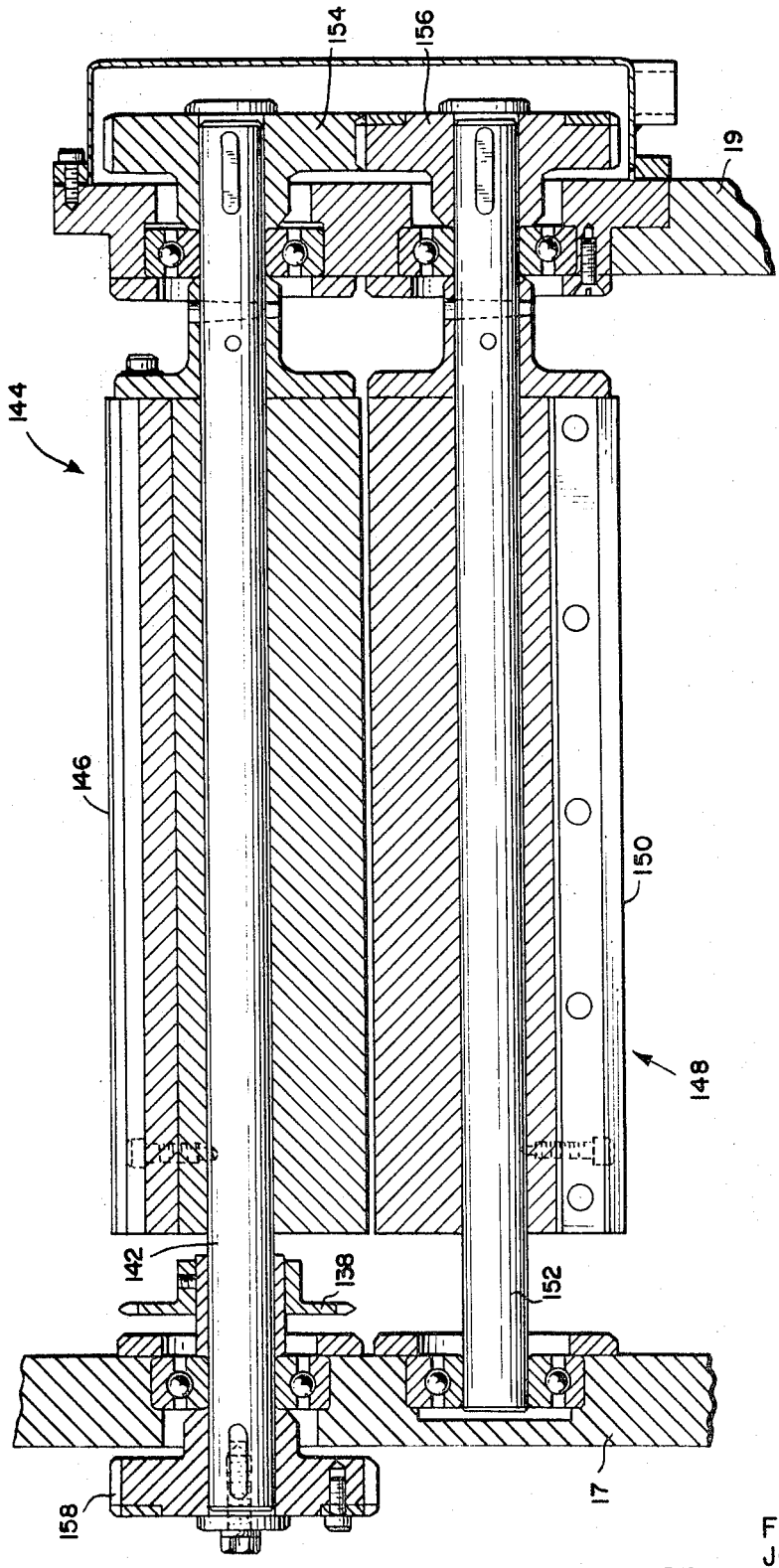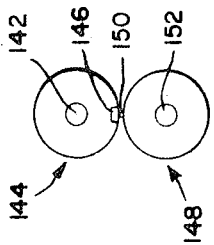

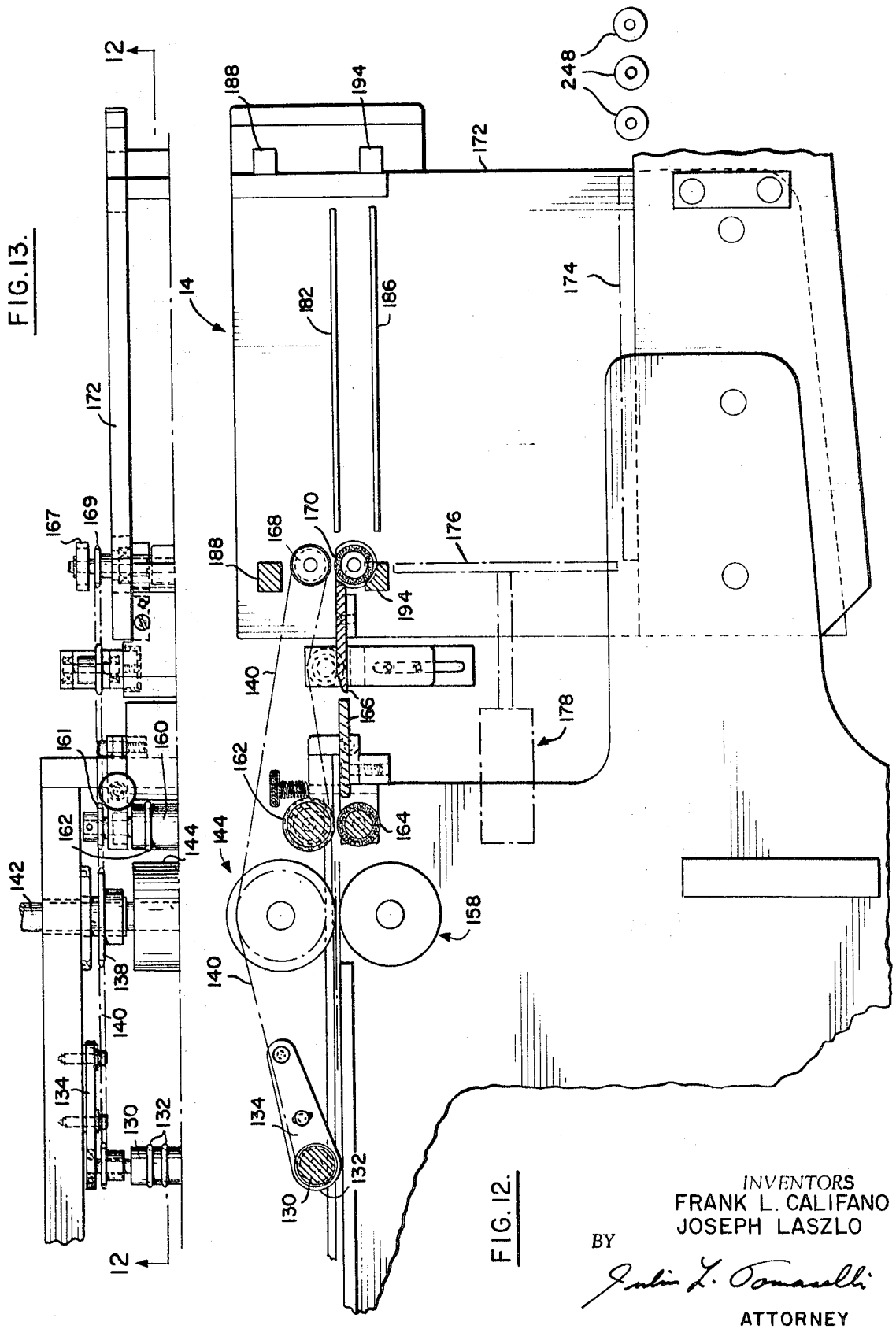

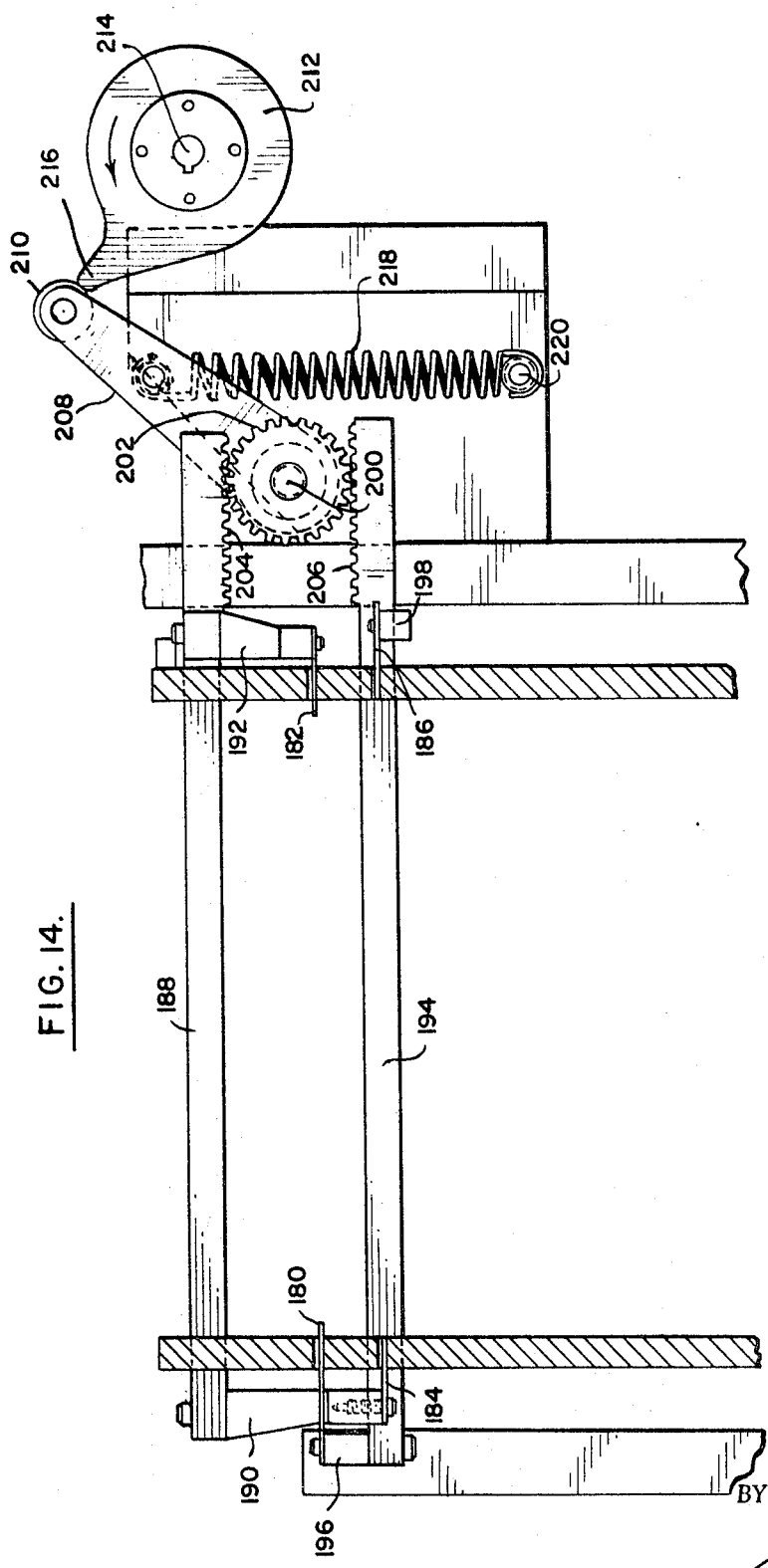

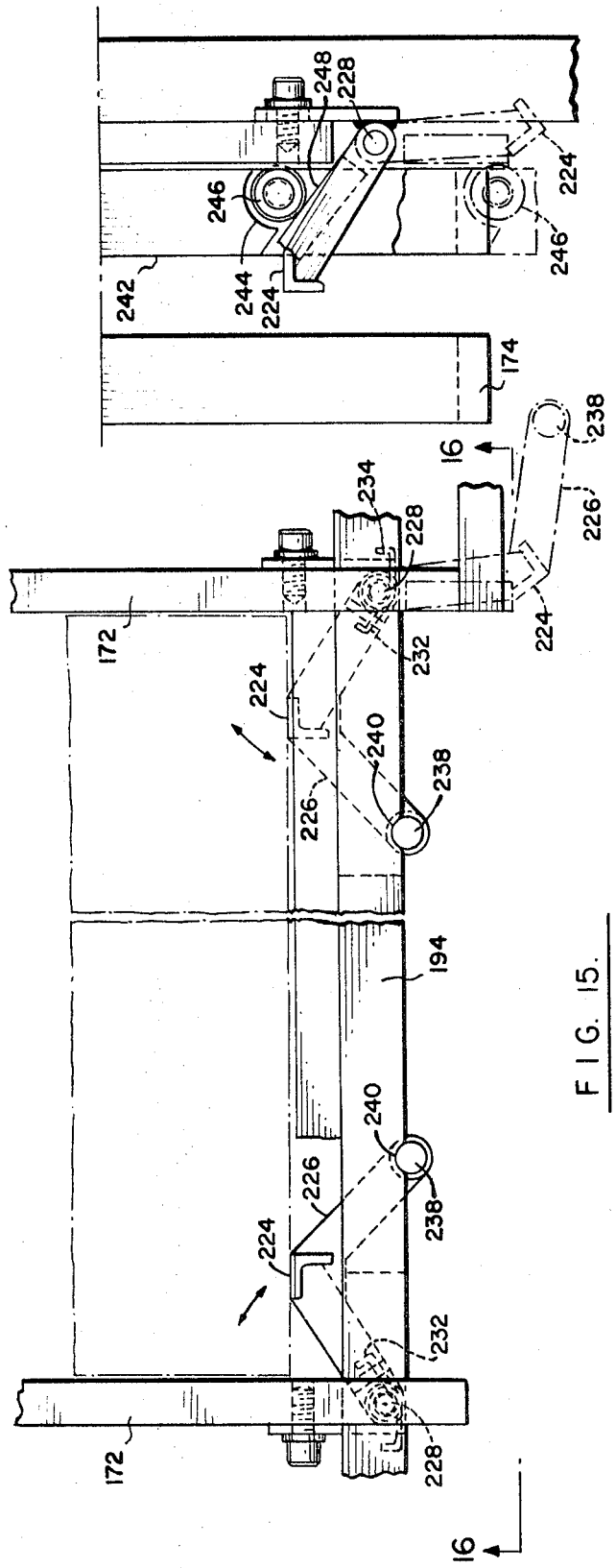

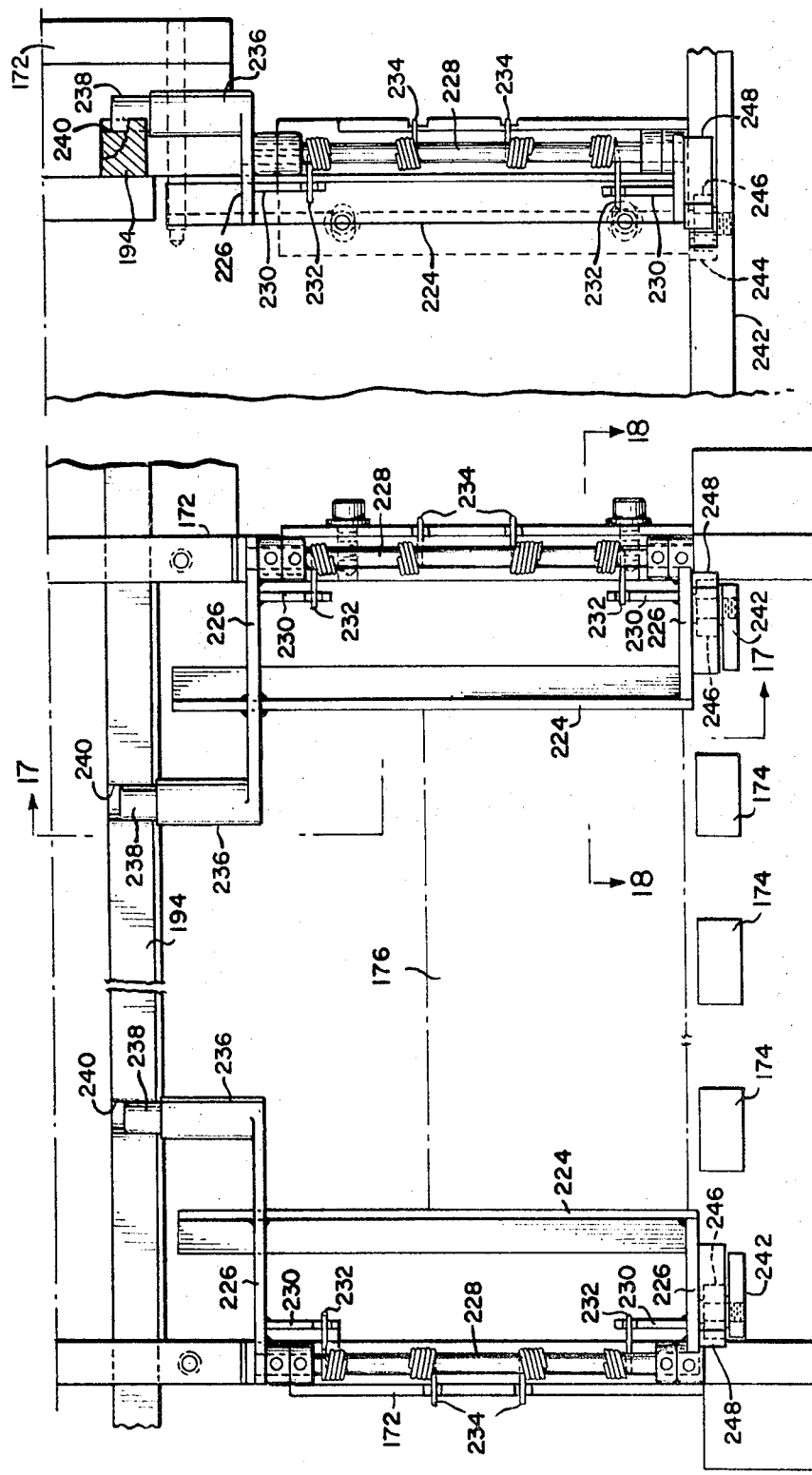

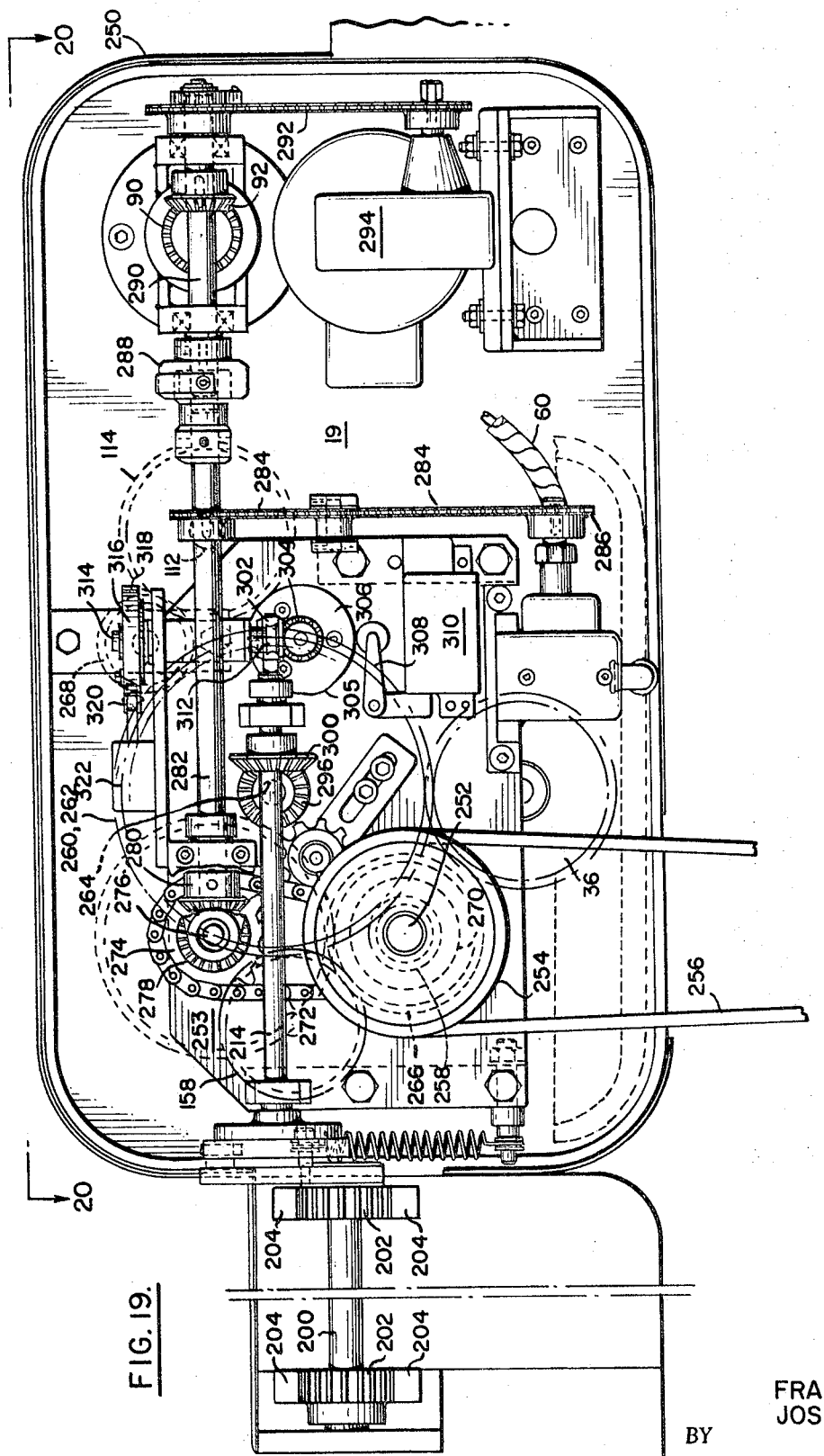

INVENTORS
FRANK L. CALIFANO
JOSEPH LASZLO
BY
ATTORNEY

FIG. 23-A.
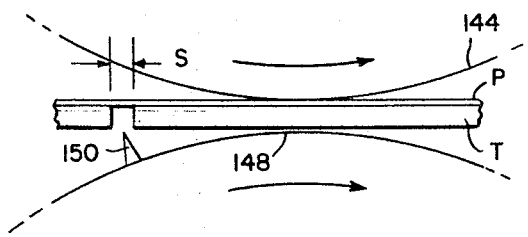
FIG. 23-B
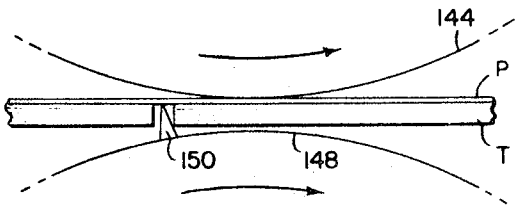
FIG. 23-C.
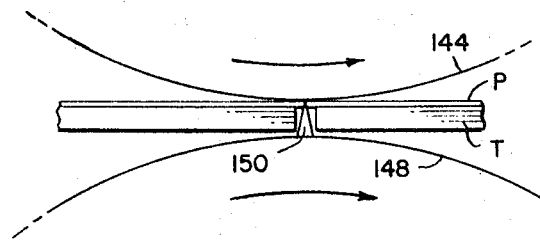
FIG. 23-D.
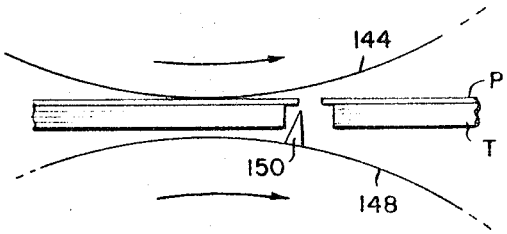
FIG. 23-E
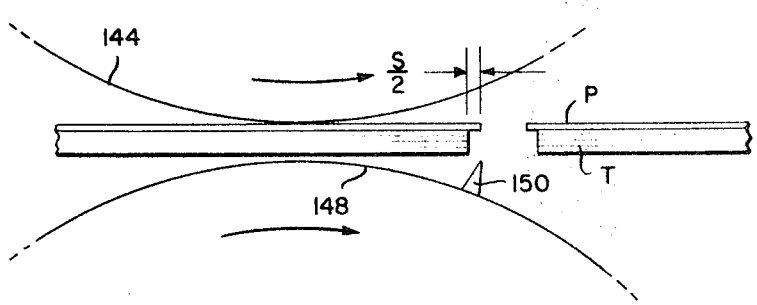

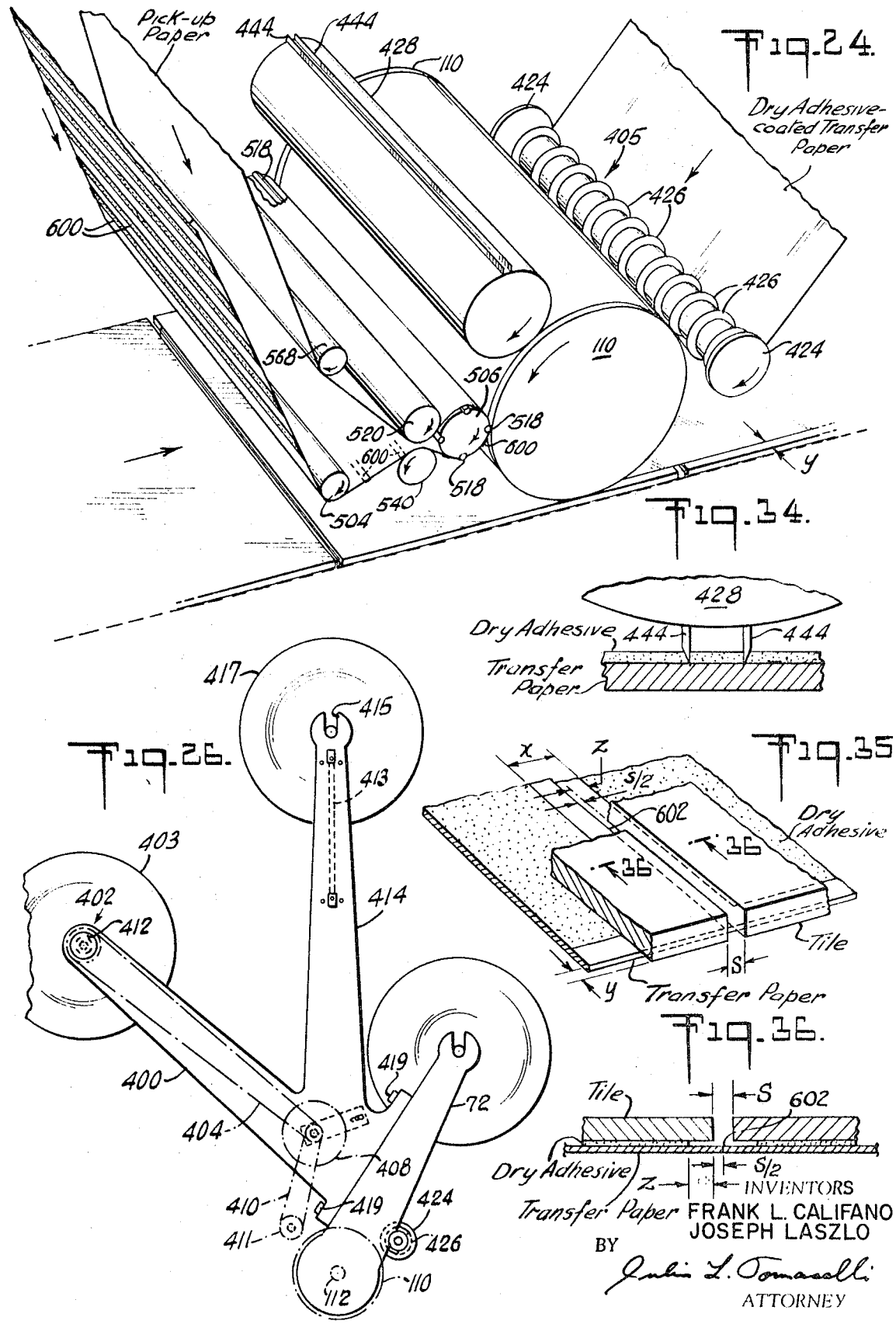

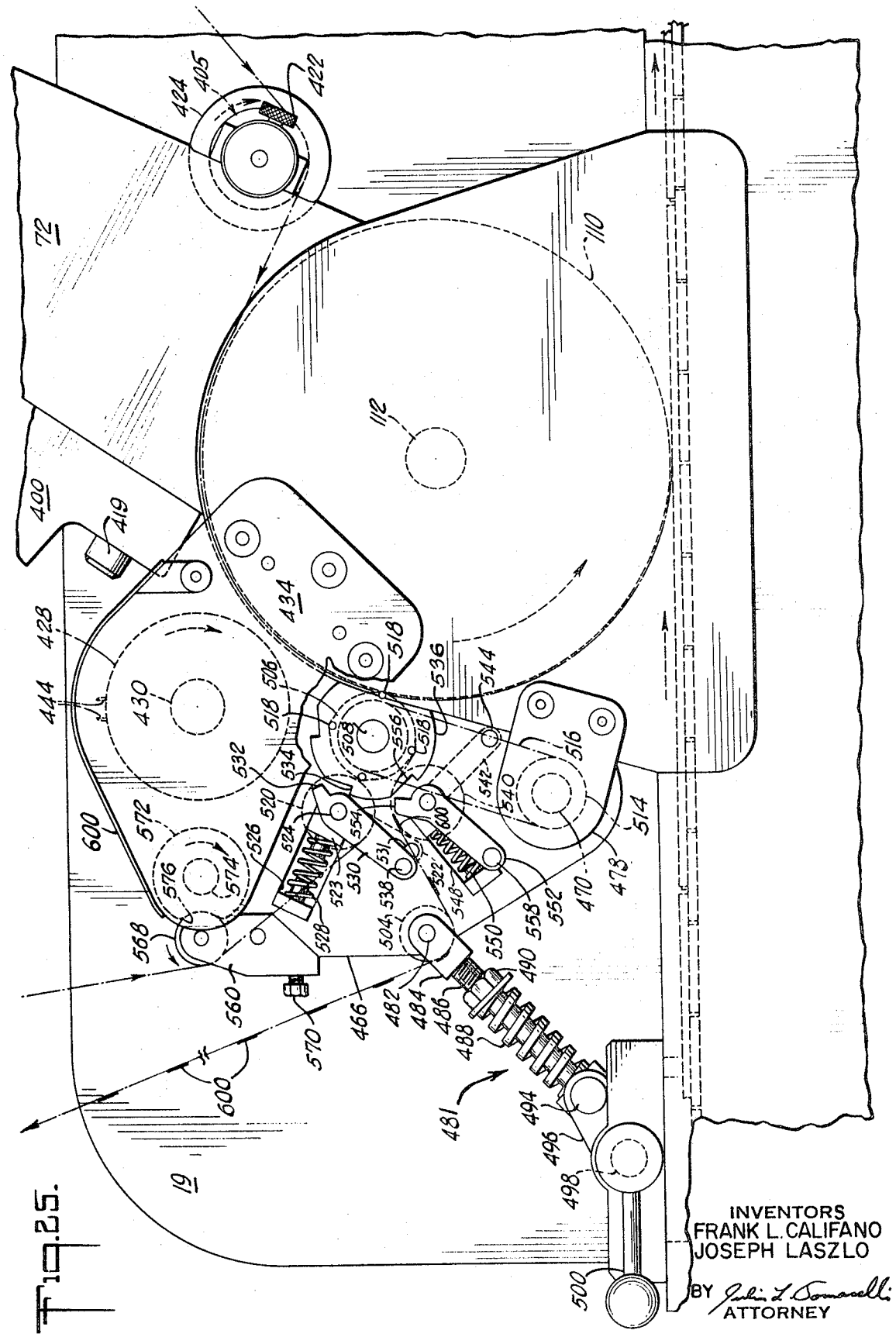

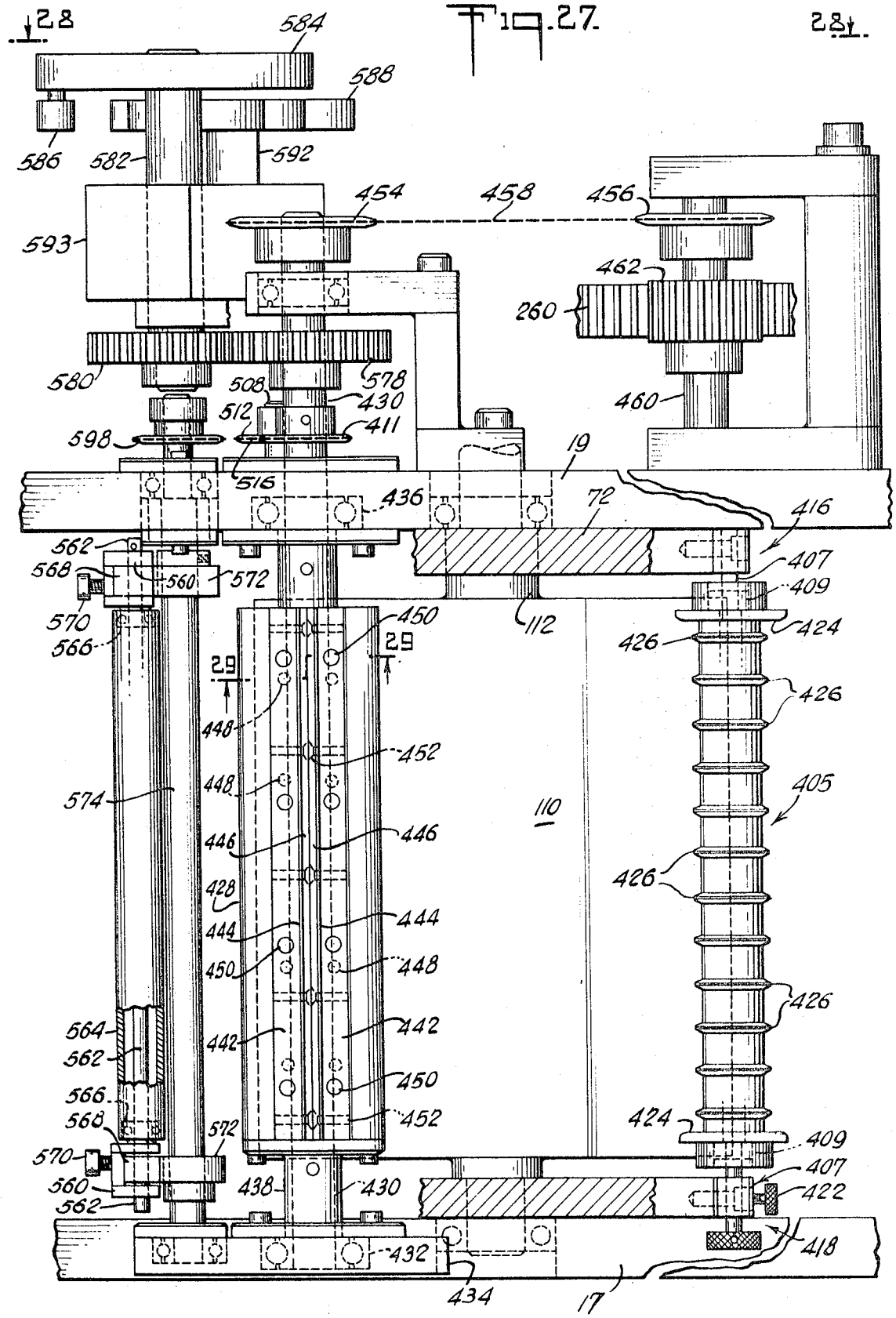

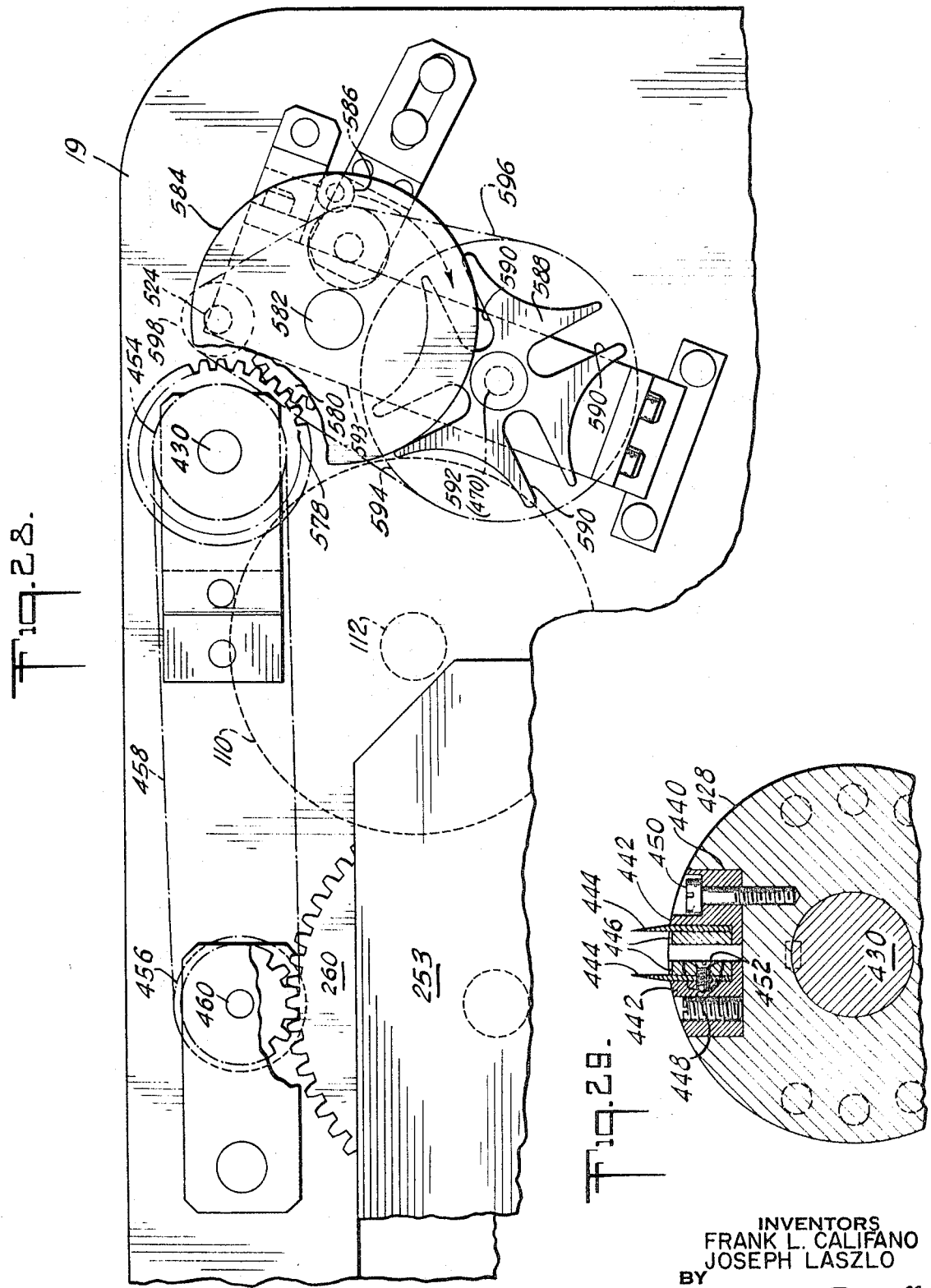

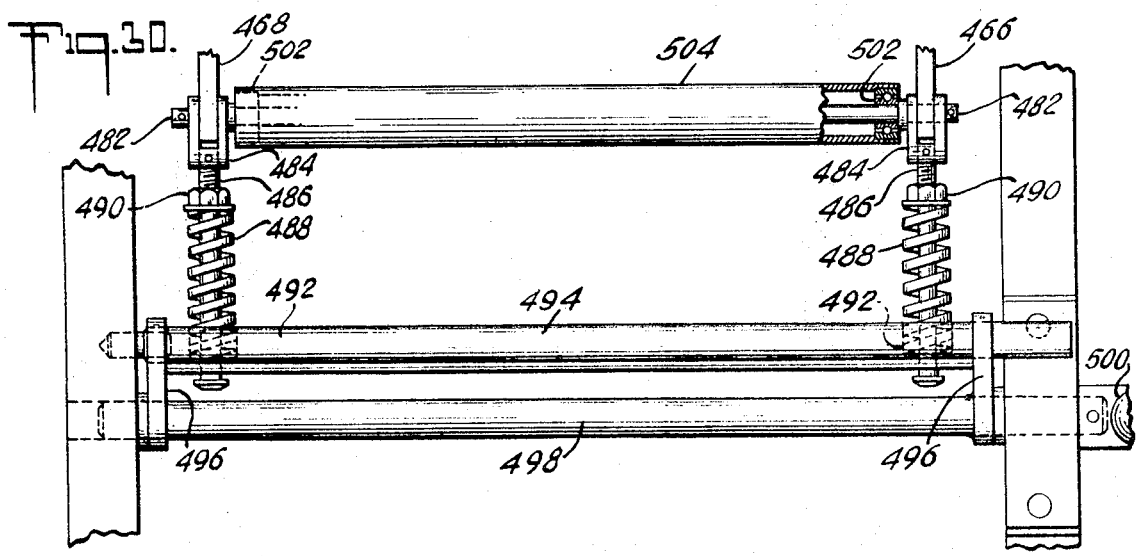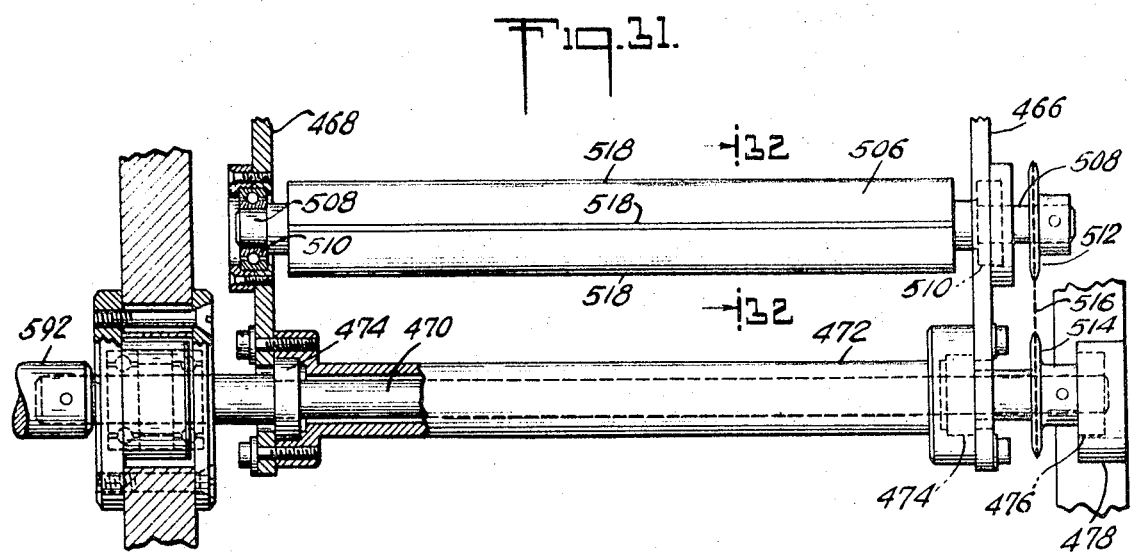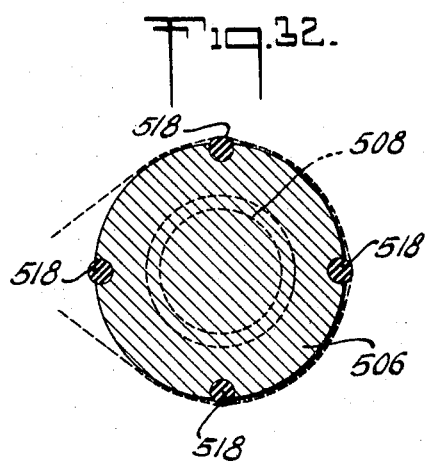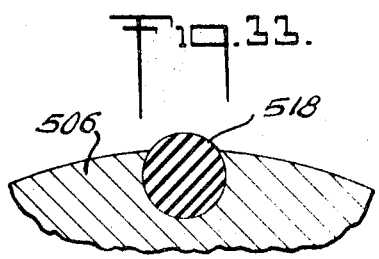

3,583,889
**APPARATUS FOR THE PRODUCTION OF
ADHESIVE-BACKED TILE PRODUCTS**
Frank L. Califano, Hackensack, N.J., and Joseph Laszlo,
  New York, N.Y., assignors to The Flintkote Company,
  New York, N.Y.
Filed Feb. 18, 1966, Ser. No. 528,569
Int. Cl. B32b 31/00
U.S. Cl. 156—516                                9 Claims

ABSTRACT OF THE DISCLOSURE

Tile products from a stack are moved in succession by a conveyor at a contant speed and in uniformly spaced relationship. A web of adhesive-coated protective material is applied over the moving tile products and bonded thereto. This web is then severed between each adjacent tile product by a cutting knife thereby producing an adhesive coated tile product with a protective sheet thereon which is removed when the tile products are installed.

---

This invention relates to tile products for application to substantially flat surfaces such as floors, walls and the like (for convenience, such tiles may be referred to herein as "floor tiles" although it should be understood that the applicability of this invention is not restricted by the end use of such tiles); and more particularly to floor tiles sold with the adhesive and a protective sheet thereon, whereby the tiles may be applied merely by peeling off the release paper and pressing them against the desired surface so that the adhesive will cause them to stick thereon.

It has been conventional practice in the past to apply tiles to a surface by first spreading a layer of adhesive over a relatively large part of the surface and then placing the tiles individually on the adhesive layer in the desired pattern. Since the adhesive layer should not be stepped on, this procedure generally has to be followed a number of times in order to cover a relatively large surface. Furthermore, once the adhesive layer has been spread, all tiles necessary to cover this layer of adhesive must be applied in a relatively short period of time or the adhesive will set, so that tiles placed on it subsequently will not be held in place by the adhesive. Although this procedure has proven satisfactory when the tiles are being laid by experienced professional applicators, it has a number of disadvantages for inexperienced persons, particularly those who are not generally enthusiastic about "do-it-yourself" projects. The conventional method of applying tiles described above depends to a great extent on the skill of the individual applying the tiles, particularly as it must be done at a fairly rapid pace while ensuring straight seams and proper adhesion. The separately packaged adhesive is also somewhat difficult to handle and can be messy to apply. Also, care must be taken to apply the tiles after the adhesive layer has attained a certain degree of "tackiness." All of these factors which must be taken into account tend to discourage the non-professional, particularly one who does not have relatively long periods of free time, such as the average housewife.

In recent years, many products have been introduced which includes pressure-sensitive adhesive and a protective sheet which is peeled away by the applicator to expose the adhesive. These products have been variously described as adhesive backed products, peel and press products, peel and stick products, and self-adhering products. Although such products have enjoyed wide success in many areas, they have not been proven commercially in those fields where reltaively large surfaces must be covered with a protective material at a reasonable cost. This fact is particularly noticeable in the flooring field where floor tiles (generally about 9" x 9" or 12" x 12") made of asphalt-asbestos, vinyl-asbestos and homogeneous vinyl have gained wide acceptance for use in the homes and in commercial buildings.

There appear to be a number of reasons for the absence of adhesive backed tiles of this type on the market-chief among them being the difficulty of producing them on a commercial basis at a reasonable cost and problems relating to the "bleeding" of the adhesive between the tile when in place or to the sides of the tile when in the shipping container. In the manufacture of tiles, particularly asphalt-asbestos and vinyl-asbestos floor tiles, the sheet of material is cut into separate tiles by a reciprocating cutter which cuts a number of tiles at once leaving part of the sheet, known as the "frame," between the cut tiles. This "frame" is then reprocessed with new raw material to form a new sheet for cutting into tiles. If conventional procedures used to make sheet goods, such as shelfing paper or vinyl film, carry their own adhesives were used with tiles of this type, the "frame" would have to be discarded as the presence of the adhesive and the release paper would not permit its being reprocessed. This waste would make the product too costly to both the manufacturer and the processor.

It has been found that even if the above procedure were to be adapted, the resultant product would not be entirely acceptable since the adhesive at the edges of the tile would have a tendency to "bleed" up between adjacent tiles when pressure was applied to it. Contrary to all prior thinking in this area, applicants have unexpectedly found that if the edges of the tile are free of adhesive, the "bleeding" of the adhesive between tiles can be substantially completely eliminated. It has also been found that this "adhesive-free" border also assists in the final placement of the tiles in position since if the tile is put into abutting relation against the adjacent tile at a slight angle, it rests on the "adhesive free" border and will not stick prematurely. However, this need for an "adhesive-free" border complicated even further the problem of manufacturing such a product on a commercially feasible basis. Nevertheless, applicants developed a commercial method, and an apparatus for carrying out such process on a continuous basis and at a high rate of speed, which applied adhesive and protective paper to pre-cut tiles so that the adhesive is set back from the tile edges and so that at least a portion of the protective paper extends beyond the respective tile edge to permit its ready removal by the person applying the tiles.

Thus, one of the principal objects of this invention was to produce a tile having an adhesive layer on its rear surface which was set back from the tile edges and having a protective sheet positioned over the adhesive. Other considerations in a satisfactory finished tile product of this type involve the ability to readily remove the protective sheet, the behavior and "shelf-life" of the adhesive itself, the compatibility of the adhesive with and its effect on the tile and protective sheet material, and adaptability of the adhesive to trouble-free application in automatic, high speed machinery. For example, certain wet adhesives will penetrate the porous tile and have an action thereon which might cause shrinkage and/or buckling of the tile; also, this action of the adhesive may reduce its own ability to bond the tile to the floor.

Another principal object of this invention was to develop successful methods to produce this product on continuously operating machinery. One concept considered involved drawing sheet material from a roll and into contact with tiles moving continuously along a conveyor, with liquid adhesive being applied directly to the tiles by means of rolls. Although this concept can operate satisfactorily to produce the desired product, the application of liquid adhesive to tiles in a pattern wherein the adhesive is set back from the tile edges (as discussed previously herein) by means of rolls is not sufficiently dependable for a continuous high-speed operation. Using an applicator roll having an axially extending gap therein, for example, would tend to cause a build-up of adhesive in this gap making neat, clean adhesive application difficult. Problems in the application of liquid adhesive directly to tiles are aggravated because, in order to maintain registry between an incoming sheet feed and the tile carried by a conveyor, it is necessary to effect positive conveyor feed by means, such as spaced pusher members, which occupy spaces between the tiles. Liquid adhesive cannot be easily applied to tiles under such circumstances without risking troublesome deposits of adhesive in the conveyor parts themselves and around the tile ends. In a continuous system, numerous problems will also be encountered in the steps of applying liquid adhesive to carefully defined and limited areas of material in web form, then cutting the web into sheets, applying them to moving tiles in precise relation, and thereafter handling these assembled units. One major problem is that once a sheet with wet adhesive has been severed from the web, it is extremely difficult to deliver this into registry with a moving tile. The slippery interface between the tile and the adhesive on the sheet is responsible for this difficulty in the maintenance of alignment. Any alternative whereby the adhesive is "printed" on the continuous web at a remote location and becomes tacky in transit prior to being cut and applied to the tile would require highly sophisticated means (e.g., perforated web edges for web feed) to ensure registry over this distance between the defined and limited adhesive areas and the tiles.

In accordance with the present invention, the above objectives have been attained by applicants' method which can be performed economically on applicants' high-speed apparatus. In one basic arrangement for carrying out this method, tiles are moved in succession along a conveyor at a constant speed and in uniformly spaced relation, while a web of adhesive coated protective material, drawn from a source in line with the conveyor travel, is applied over the moving tiles. By virtue of either the use of a "dry" pressure-sensitive adhesive or by effecting a localized tackiness of a wet adhesive (by a technique discussed hereafter) the web immediately sticks to each tile and problems of handling caused by a slippery interface are avoided. By means of a novel cutting mechanism, in this overall arrangement, the web is cut into sheets after it has been positioned on the tiles thereby ensuring that the tiles will not separate until after the adhesive-coated web has been united with the tiles in proper registry. Because the transfer material has been at least partially adhered to the tiles, and it is severed after proper registry has been effected, the tiles can be stacked and packed immediately without the disturbances previously discussed.

In one specific embodiment of the apparatus of the invention, wherein liquid adhesive is used, the problems previously associated with the slippery quality thereof have been solved by utilizing a novel concept which involves the intentional acceleration of tackiness or "setting" of the adhesive over a small localized area on the bottom surface of each tile, prior to its being joined with the wet adhesive covered web, a small quantity of a chemical agent which will effect such acceleration when it subsequently contacts the adhesive. At this localized area the prematurely "set" adhesive effects a sufficient interlock between the sheet material and the tile to permit orderly orientation and handling thereof both before and after the cutting of the sheet material between adjacent tiles. In this particular embodiment, the liquid adhesive is applied to the web as it passes around a cylinder en route to being joined with the tile over areas smaller than the respective area of the tiles, whereby the pressure-sensitive adhesive is set back from the tile edges.

Another specific embodiment of the apparatus of the invention employs a substantially dried pressure-sensitive adhesive which is carried by the protective or release paper to the tile in a machine essentially the same as employed in the first embodiment. Whereas, when liquid adhesive is used, it is "printed" on the web to leave uncoated or empty transverse spaces to span the gaps between adjacent tiles, this embodiment required the addition of a unique step wherein a strip of the dried adhesive, corresponding to such transverse spaces, is actually peeled or lifted from the web of release paper prior to its being brought into engagement with the conveyed tiles. As will be described in full detail hereafter, this step involves the cutting of a pair of parallel slits through the adhesive layer and just slightly into the web of release paper.

In the overall arrangement of apparatus common to both of the above-described successful variations for producing the desired tile product, a significant element is the ability to separate tiles, after they are engaged by the web, at transverse locations between them. In this apparatus, a rotary cutting knife approaches and enters the space between each adjacent pair of tiles to cut the web from the side facing the tiles after which the separate tiles are properly counted, squared and stacked for placement in a shipping container.

Further objects, details and advantages will become apparent from the following description, read in conjunction with the accompanying drawings, in which:

FIG. 1 is a schematic illustration of an overall side view of the basic machine arrangement according to this invention;

FIG. 3 is a side view of the conveyor chain structure and FIG. 4 is a cross-section taken as indicated by lines 3—3 in FIG. 3;

FIG. 8 is a plan view of the roller assembly for applying wet adhesive to the transfer paper;

FIG. 10 is an axial section through the two cylinders for severing the transfer paper between tiles;

FIG. 11 is a schematic cross-section through the rolls shown in FIG. 10;

FIG. 12 is a side view of the paper severing and stacking sections of the machine;

FIG. 13 is a partial plan view of the parts shown in FIG. 12;

FIG. 14 is a cross-section through the escapement section of the stacking mechanism;

FIG. 15 is a plan view of the squaring mechanism incorporated in the stacking mechanism;

FIG. 16 is an end view of the squaring mechanism shown in FIG. 15;

FIG. 17 is a partial side view of the structure shown in FIG. 16;

FIG. 18 is a cross-section taken as indicated by lines 18—18 in FIG. 16;

FIG. 19 is a front view of the opened main drive transmission box;

FIGS. 23A to E are schematic illustrations of the precisely timed cutting action involved in separating successively delivered tiles;

FIGS. 24 to 36 are drawings of a modified embodiment of the apparatus and method according to this invention, these drawings including:

Figure 2:
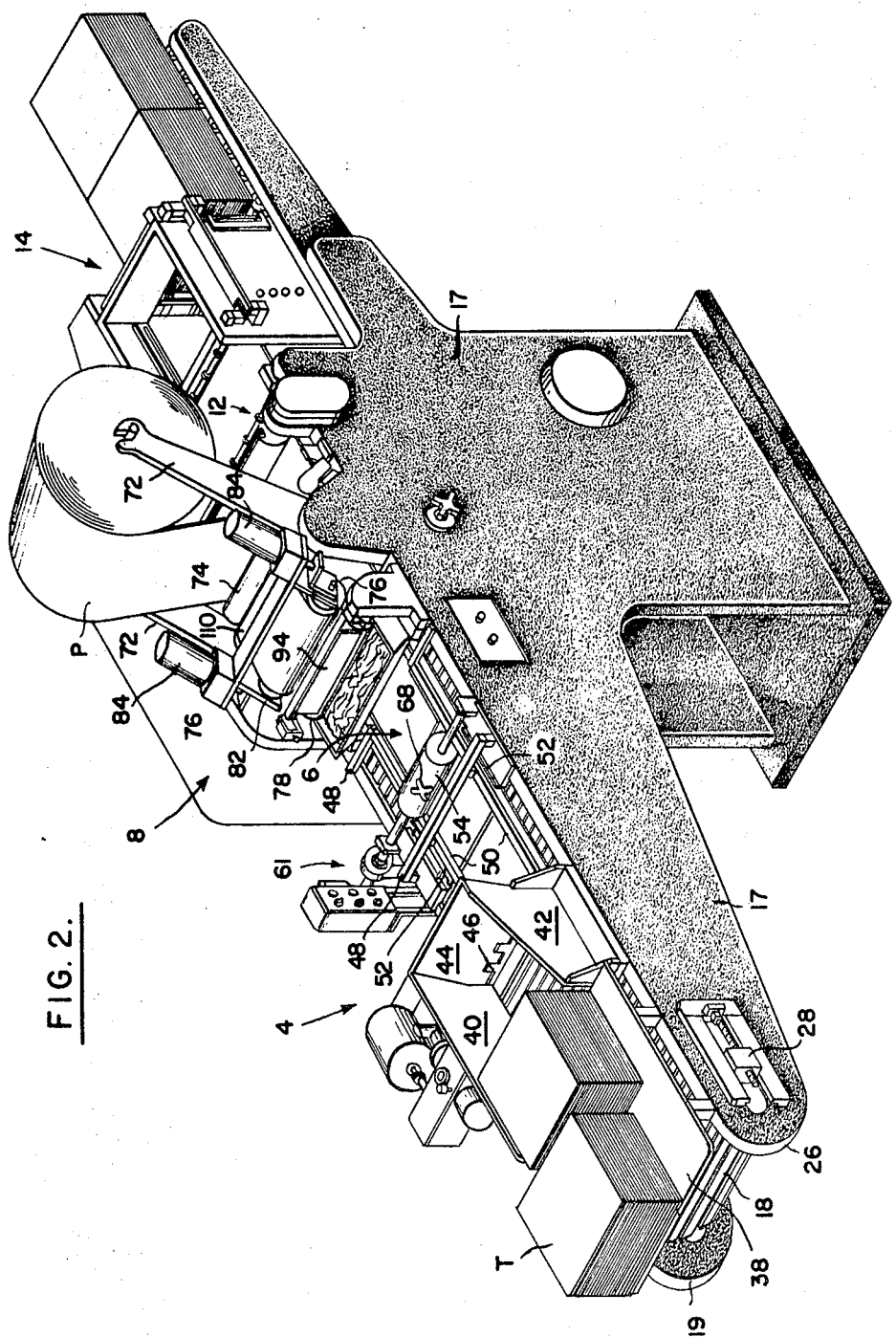
FIG. 2 is an isometric view of the machine illustrated in FIG. 1.

FIG. 24, which is a schematic perspective illustration of the modified apparatus;

FIG. 25 is an elevation side view of this apparatus;

FIG. 26 is a side view showing the various paper roll stands;

FIG. 27 is a plan view of the apparatus;

FIG. 28 is a side view taken as indicated by lines 28—28 in FIG. 27;

FIG. 29 is a cross-section through the cutting knifes, taken as indicated by lines 29—29 in FIG. 27;

FIG. 30 is a sectional view showing the toggle mechanism for positioning the carriage assembly;

FIG. 31 is a sectional view showing the pick-up roll assembly;

FIG. 32 is a cross-section of the pick-up roll taken as indicated by lines 32—32 in FIG. 31;

FIG. 33 is an enlarged partial cross-sectional view of the pick-up roll;

FIG. 34 is an enlarged partial cross-section illustrating the depth of cutting of slits in the transfer paper;

FIG. 35 is a schematic perspective bottom view illustrating the dimensional relationships of the tile, paper and adhesive; and FIG. 36 is a section taken as indicated by lines 36—36 in FIG. 35.

The entire machine is schematically outlined in FIG. 1. The main machine components are associated with a conveyor 2, the upper run of which travels toward the right as viewed in FIG. 1. The tiles are generally designated by the letter T in the drawings, and are supplied to the conveyor 2 by a bottom feed hopper arrangement generally indicated at 4. A very specially constructed unit for applying to the tiles an agent which will subsequently accelerate the setting of a localized area of adhesive is generally indicated at 6. At 8 there is generally indicated an adhesive applicator which applies a thin coating of the adhesive uniformly to one side of a continuous paper web P, and at 10 there is generally indicated a laminating roll assembly for pressing this paper P against tiles T. At 12 there is generally indicated a severing mechanism adapted to cut the paper web P along lines between the adjacent trailing and leading edges of tiles. After severing by mechanism 12, the finished composite paper and tile units undergo a positive separating action and are then delivered to a stacking section generally indicated at 14, from which stacks are delivered onto a delivery conveyor 16. The tiles T may be any commercially available type of tile, commonly described as vinyl-asbestos tile, rubber tile, homogeneous vinyl tile, asphalt-asbestos tile, wood tile, and the like. Normally, these tiles are relatively thin, on the order of from $\frac{1}{16}$ inch to $\frac{1}{8}$ inch in thickness, and are nine inches or twelve inches square. However, such tiles come in a number of other sizes, shapes and thicknesses and it will be readily understood by those in this field, that the present invention can be utilized for any of these modifications. The specific process, machine and tiles T described hereinafter relate to square cut tiles for convenience of description, although it will be readily apparent that the concepts involved in the present invention have general utility for all types of commercial floor tiles.

The paper P comprises what is conventionally referred to as "release paper" which may be a standard paper treated with a release agent, such as silicone, so that the adhesive will separate more readily from the paper than it does from the tile. Alternatively, the treated paper may be replaced by sheets or films of materials such as Mylar, Teflon, polyethylene or the like from which the adhesive will readily separate. Thus, the term "paper" as used in the specification and claims is intended to refer to and include such synthetic films and various mixtures of cellulosic materials and resins, as well as ordinary paper coated with special release compositions.

Figure 5:
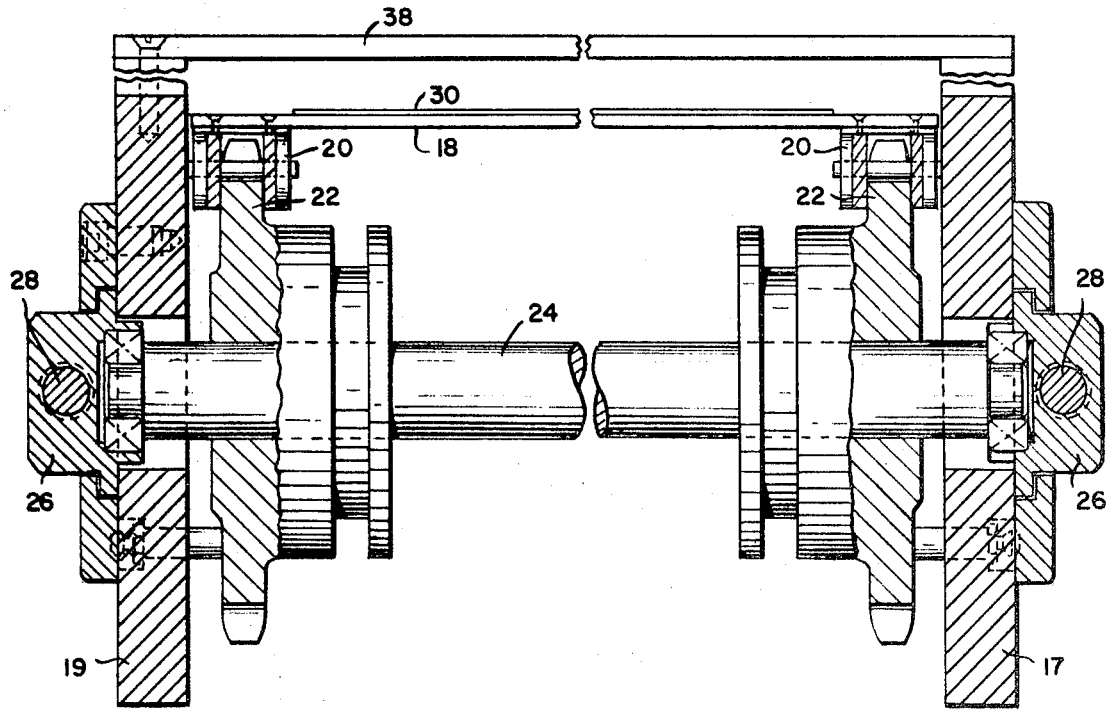
FIG. 5 is a cross-section through the conveyor, looking toward the left-end or receiving portion thereof.
Figure 21:
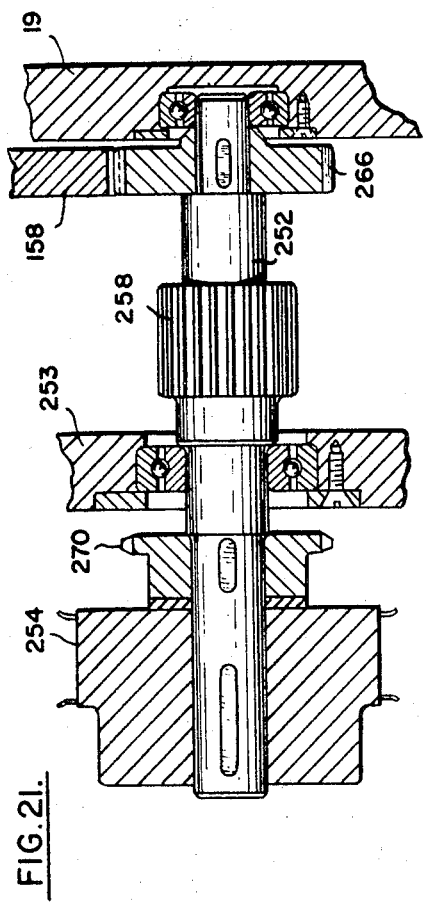
FIG. 21 is an axial section through the main drive shaft.
Figure 6:
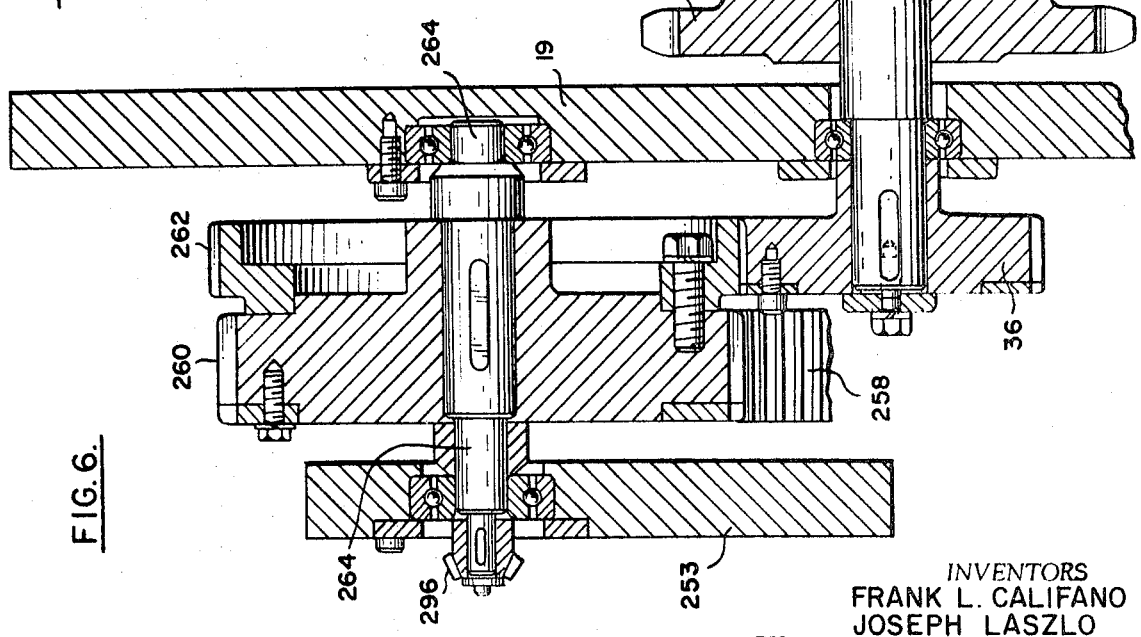
FIG. 6 is a further conveyor cross-section taken at about the location of the main drive transmission box and showing the driving connection to the conveyor.

Referring to FIGS. 3, 4 and 5, the conveyor 2 comprises a plurality of slats or flat bars 18 which are mounted crosswise on a pair of precision made and exactly aligned chains 20. As evident particularly from FIG. 2, the conveyor and other parts of the machine are housed within a frame comprising essentially a pair of heavy steel parallel front and rear side plates 17 and 19, respectively. At the receiving end of the conveyor the chains 20 are trained about a pair of sprockets 22 which are keyed to a shaft 24. In a highly accurate, high speed machine of this type it is essential that the conveyor flights maintain exact perpendicularity to the direction of travel. Therefore, shaft 24 has its end journalled in bearing blocks 26, each of which is adjustable by means of a lead screw 28 to obtain proper conveyor alignment. Referring to FIG. 6, at the other end of the conveyor the chains 20 travel about sprockets 34 which are keyed to a shaft 32. As described more fully hereafter, conveyor 2 is driven through a gear 36 on the shaft 32.

From FIGS. 3, 4 and 5 it will be seen that certain conveyor bars 18 are machined to provide an upstanding narrow pusher flight 30. The spacing of successive pusher flights 30 is very slightly greater than the side-to-side dimension of a square tile, so that these tiles follow one another through the machine with a very small gap, approximately $\frac{1}{16}$ inch, between their adjacent trailing and leading edges. A loading table 38 is provided to support stacks of tiles T prior to their being loaded in the bottom feed hopper 4. This hopper comprises front and back sidewalls 40 and 42, respectively, and a forward wall 44. The bottom of wall 44 incorporates a vertically adjustable plate 46, the adjustment being to raise or lower the lower edge thereof relative to the conveyor bars 18. A clearance between the lower edge of plate 46 and the upper edge of each pusher flight 30 is provided, whereby as the latter passes beneath the hopper 4 it engages the rearward edge of the tile and withdraws it from the stack.

As evident from FIG. 2, fixed brackets 48 extending inwardly from the machine framework support a pair of vertically adjustable hold-down guide bars 50. Rails 52, one of which is laterally adjustable and spring-biased, project inwardly to abut and guide the side edges of the tiles on the conveyor. It should be noted that the purpose of such means is to carry tiles in exactly spaced and aligned relationship through the machine in preparation for their having applied the paper P, which transfers adhesive to the tiles and serves to protect them prior to use by the consumer.

Figure 7:
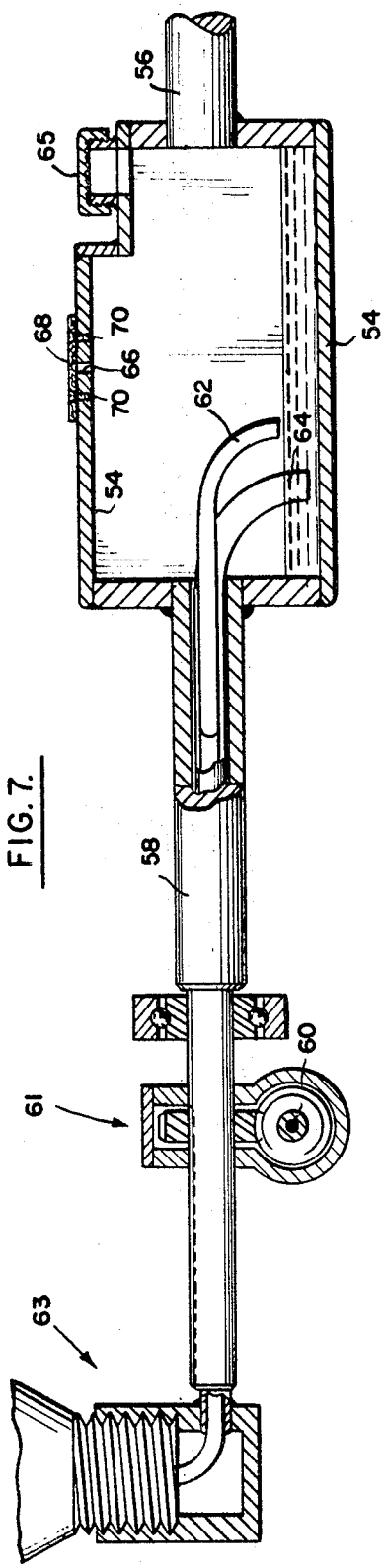
FIG. 7 is an axial section through the roll assembly for applying to the tiles an agent which accelerates setting of the subsequently applied adhesive.

The means, previously mentioned, for applying an agent which accelerates setting or otherwise affects an adhesive comprises essentially a hollow roller 54. Referring particularly to FIG. 7, which is an axial cross-sectional view, roller 54 has a pair of axial shafts 56 and 58 whereby it is journalled in bearings in the main frame. Roller 54 is driven through a flexible coupling 60 from the main drive transmission box which will be described hereafter. The roller 54 comprises a rotating reservoir, with the chemical liquid agent therein being replenished and having its liquid level sensed through a system 63 having stationary tubes 62 and 64. A threaded cap 65 provides access to the interior or roller 54, for example for the purpose of cleaning or supplemental filling thereof. The function of roller 54 is to apply to each tile T a moistened area (comprising the adhesive-set accelerating agent), and to this end it has a hole 66 drilled in its casing. Hole 66 is covered by a felt pad, in the shape of a cross or X as evident in FIG. 2, which is secured by screws 70. Liquid escaping through hole 66 soaks the pad 68, which in turn contacts each tile as it passes therebeneath in timed relation with rotation of roller 54.

Referring to FIG. 2, a roll of special adhesive transfer paper P has its axle supported in a pair of arm 72 which extend from the side frame plates 17 and 19. From this roll, paper is drawn about a tension controlling roller 74, and thence about a roller 76. Referring next to FIG. 8, the adhesive applicator assembly includes a special roll 78. The surface of roll 78 is deeply serrated or grooved to provide many pockets to store adhesive which is transferred to the surface of paper P following the removal of excess by doctor blade 94. As glue is applied to the roll 78 through immersion, it in turn applies it to one side of the paper P, which in its path of travel is pressed between the rollers 78 and 76. Roll 76 is journalled in a pair of arms 82. (For the purpose of lifting roll 76 away from contact with paper web P, or for pressing it into contact therewith, arms 82 are connected to respective pneumatic piston and cylinder units 84, which form no part of this invention and are not therefore specifically disclosed in their control aspects.) Referring to FIG. 8, roll 78 is rotated on axial spindles 88 journalled at opposite sides of the conveyor. Through bevel gearing 92, the roll 78 is driven from the main drive transmission box which will be described more fully hereafter. A doctor blade 94 rests on the roll 78 and has its ends reciprocably received in side mounts 96. Reciprocation of doctor blade 94 is desirable in order to deposit a uniform layer of adhesive on cylinder 78, and this is effected by means of a cam 98 on shaft 88. A cam follower roller 100 is carried on the end of a swinging arm 102, and rises within the eccentric groove 99 of cam 98. At the axis of roller 100 there is a projecting stud 104 which is received in the slot of an arm 106 connected to blade 94 whereby oscillation of arm 102 by cam 98 is transmitted to blade 94. Beneath the cylinder 78 there is a pan 108, in which a pool of the special adhesive is maintained at a level to wet the lower surface of roll 78.

From FIG. 8 it will be evident that the chevron or V-shaped grooving on rollers 78 is limited in width along the axial length of the roller, and that in the circumferential direction this is interrupted by a "flat" or "land" extending parallel to its axis. What is involved is that, in effect, the liquid adhesive is printed on the paper web in a pattern corresponding to that in which it is desired to place the adhesive on the tiles. The grooves in the roll 78 are intended to pick up and to transfer liquid adhesive, whereas the ungrooved portions are wiped clean by the doctor blades 94 and do not deposit adhesive. Adhesive is deposited only within boundaries at predetermined distances inwardly from the edge of the tile, for example, about $\frac{1}{16}$ to $\frac{1}{8}$ inch. These boundaries are indicated by broken lines 69 in FIG. 22. Thus, the width of the grooved glue accepting portions of roller 78, measured along its axial length, is about $\frac{1}{8}$ to $\frac{1}{4}$ inch less than the width of a tile. Similarly, the width of a non-grooved, non-accepting roll portion extending longitudinally is of the order of $\frac{3}{16}$ to $\frac{1}{4}$ inch.

Figure 9:
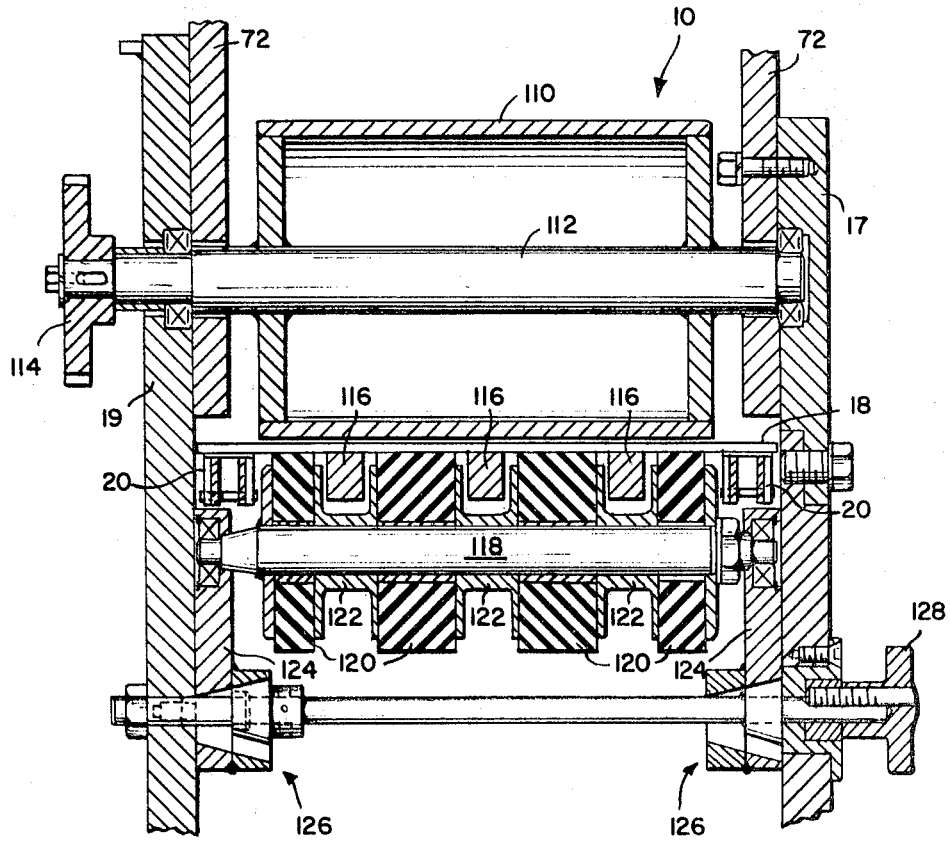
FIG. 9 is an axial section through the laminating roll stand assembly and conveyor.

The laminating roller stand 10 is shown in axial section in FIG. 9. A cylinder 110 has an axial shaft 112 which is journalled in bearings in the side frame plates 17 and 19, and is driven through a gear 114 from the main drive transmission box to be described hereafter. Extending throughout the length of the conveyor beneath the bars 18 are supporting rails 116. As the location of cylinder 110, however, means are provided to raise the conveyor bars 18 slightly to press tiles against this cylinder 110. Such means comprise a plurality of fiber or rubber wheels 120 which are mounted, between spacers 122, on a shaft 118 that is freely journalled in bearings in vertically adjustable side plates 124. Vertical adjustments of this assembly are effected through conventional means 126, as determined by the manual setting of a knob 128. It should be noted that cylinder 110 is driven exactly in synchronism with the travel of tiles on the conveyor, and as paper P emerges from the adhesive coating cylinder 78 it is brought smoothly into pressure contact with the tiles at the cylinder 110.

As the paper P is pressed against the tile T, it comes into contact with the adhesive setting agent applied at area 67 (FIG. 22) by means of roll 54 (FIG. 7). For any given adhesive to be transferred to the tile, this agent is selected from any of the chemicals or compositions which are known to have the effect of causing the adhesive immediately to take on a tacky condition or "set" condition. In the wet condition, certain adhesives which are particularly suitable for this type of ready-to-lay tile exhibit a slippery characteristic. If, then, square sheets of paper P are applied to individual tiles T with this slippery interface in between, it has been found that the stacking and handling of the composite units involves serious difficulties because of their tendency to slide relative to one another. According to this invention, however, any such sliding is obviated by the application of the quick-setting agent applied by roll 54. Within the limited area 67 (FIG. 22) the applied adhesive layer reacts to contact with the setting-agent by establishing immediately a tacky grip between the paper P and tile T, they become in effect a single unit for purposes of further handling and relative sliding movement is inhibited.

A pressure-sensitive adhesive which has been successfully used for this embodiment of the invention is described in Example 1 of the co-pending application of John J. Drukker, Ser. No. 408,649, which was filed Nov. 3, 1964 and which is entitled "Water-Dispersed High Solids-Content Adhesives of Elastomers and Tackifiers and the Method of Production of the Aqueous Dispersion." A number of adhesive quick-setting agents (applied by roller 54) are suitable for use with the above-mentioned adhesive; however, one preferred quick-setting agent for this adhesive is an acetic acid solution. As is well known in the adhesive art, various water and solvent based adhesives have pressure-sensitive properties and may be utilized in accordance with this invention. Depending on the particular composition of such adhesives, different quick-setting agents would be used, all as known in the art. It should be noted that the wet adhesive is chosen because of numerous factors, among them being satisfactory "shelf-life," i.e., the adhesive does not adversely change in effectiveness, composition or consistency after being stored for a substantial time before use, and the property of not having the tendency to penetrate and/or warp the tiles.

As "tiles" emerge from beneath cylinder 110, they pass beneath a roller 130 having spaced annular rubber rings 132 thereon, the roller 130 being journalled in pivotally adjustable arms 134 and driven by a chain drive through sprocket 136. (Hereafter the term "tiles" should be understood as referring to a composite tile, or the assembly comprising a tile T and paper P applied thereover with adhesive therebetween.) The chain 140 is driven by a sprocket 138 on the severing mechanism input shaft 142, which is driven from the main drive transmission box to be described hereafter.

The severing mechanism comprises a first drum 144 having a special insert 146 therein which provides a backing for the cutting blade 150 inserted exactly in alignment with the axes of shafts 142 and 152. Drum 148 is driven in precise synchronism with drum 144 through precision, anti-backlash gearing 154, 156. As can be seen in FIG. 12, after each tile leaves the laminating roller stand, the conveyor terminates and further travel is taken over by the frictional rings 132 on the driven roller 130. The tiles then enter the severing mechanism 12 under the influence of these rings 132. At the other side of the severing mechanism, there is a further set of feeding means comprising a roller 160 having annular rings 162 thereon, and driven from chain 140 through a sprocket 161. Roller 160 is coupled to a lower frictional driving roll 164 through gearing, not shown. Following the severing of paper between tiles, and thereby separating them, acceleration of the leading tile is effected to insure complete separation. This acceleration is effected by a pair of rolls 168, 170, which also is driven from chain 140 through a sprocket 169. Accelerating rollers 168 and 170 are coupled by gearing 167, and are driven at a rate faster than the rolls 162, 164, i.e., faster than the rate of travel of the tiles during the severing operation.

Figure 22:
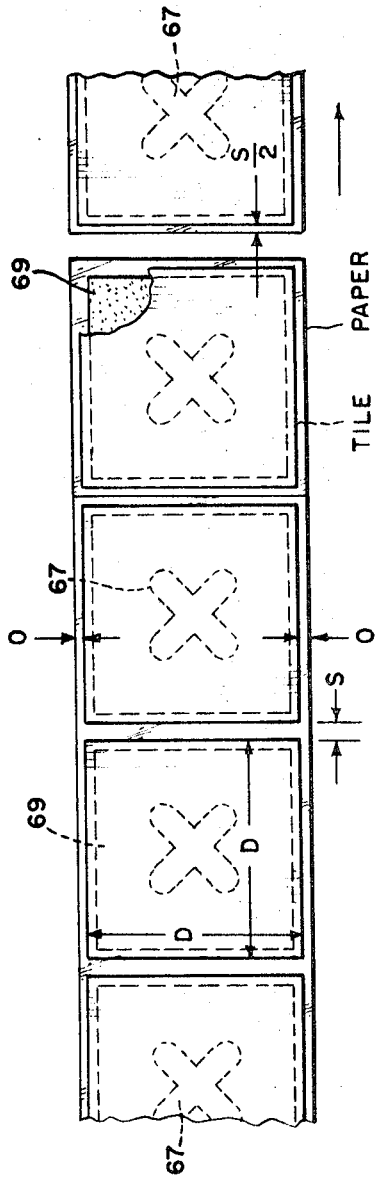
FIG. 22 is a schematic bottom view illustrating the relation between the tiles, transfer paper and adhesive.

Novel aspects of this invention reside in the cutting action roughly illustrated by FIGS. 23-A, B, C, D, and E. Referring first to FIG. 22, it is noted that the tiles T are carried by conveyor 2 in a predetermined spaced relation indicated by the measurement "S" in this drawing. Spacing S is very small in the machine according to this invention, being approximately 1/16 inch, and to sever the paper P exactly midway between the adjacent edges of a pair of closely spaced tiles while moving continuously along the conveyor was a problem. This has been achieved in this arrangement wherein a thin knife blade, moving in precisely timed relation, penetrates within this gap from the side opposite the paper and severs it against a backing roller acting directly against the outer paper face. As seen in FIGS. 23-A and B the knife 150, moving in exact synchronism with the rate of travel of the tile T, enters the narrow gap S without touching or interfering with the continuous conveying of the titles. The reason for this close spacing is that it is desired to produce a very small lip or overhang of paper at the edges of the tile by means of only a single cut to effect separation; accordingly, this overhang equals one-half of the small spacing S. As seen in FIG. 23-C the knife then cuts through the paper P. The leading tile then comes under the influence of the accelerating rolls 162 and 164. Referring to FIGS. 24-D and 24-E, this accelerating action effects complete separation along the cutting line. The remaining lip or overhang of paper is indicated at $S/2$, equal to one-half the spacing S.

The stacking section 14 is housed in a pair of spaced side plates 172 (see FIGS. 12, 13, 14, 15, 16, 17 and 18). During the stacking operation the tiles are supported on bars 172 presenting a relatively small, polished surface to minimize resistance to sliding of a stack therefrom. The removal of a stack is effected by reciprocation of a pusher plate 176 by activating momentarily a piston and cylinder unit 178. As described hereafter, the control system for unit 178 incorporates a selective feature whereby it can be operated automatically to deliver stacks of either 80 or 48 tiles. Referring to FIG. 14, there is shown the arrangement of two pairs of plates which are operable in the nature of an escapement mechanism for dropping groups of tiles onto the bars 174. Upper plate 182 and the opposite lower plate 184 are mounted on brackets 192 and 190, respectively, which are suspended from reciprocable upper crossbars 188. Plates 186 and 180 are mounted, respectively, on brackets 196 and 198 which are connected to reciprocable crossbar 194. When upper crossbars 188 move to the left as viewed in FIG. 14 the plate 182 is projected inwardly and plate 184 is withdrawn, and the lower crossbars 194 operate the plates 180 and 186 in the same manner. Two gears 202 are keyed to a common shaft 200, and mesh with racks 204 and 206 on the crossbars 188 and 194. Shaft 200 is journalled in the main frame members, and has an arm 208 whereby gears 202 can be rotated to reciprocate crossbars 188 and 194 in opposite directions. Arm 208 has a cam follower roller 210 which rides on a cam 212 having a finger or lobe 216. Cam 212 is mounted upon and rotated by a shaft 214 which is driven from the main transmission box to be described hereafter. Arm 208 is urged into engagement with cam 212 by a tension coil spring 218 and is anchored to the frame at 220. It will be evident from FIG. 14 that during the greater part of a revolution of cam 212 the plates 184 and 186 are projected inwardly while the plates 180 and 182 are withdrawn. While plates 184 and 186 are projected inwardly, they have deposited thereon a predetermined number of successively delivered tiles, and as they are withdrawn they drop this number onto the stack below; simultaneously the projected plates 180 and 182 catch the succeeding tile being delivered.

In the machine particularly illustrated, the relationship between the gearing of the stacker and the conveyor 2 is such that this predetermined number is eight. That is, groups of eight tiles each are delivered consecutively until a completed stack of 80 or 48 tiles has been completed.

The stacking section 14 also incorporates a means for squaring the tiles as groups thereof are deposited on the stack. This means comprises essentially a pair of vertical squaring members 224 carried by arms 226 which are oscillated about the axis of spindles 228. Coil springs 232 act against fingers 230 (FIGS. 16 and 17) to bias bars 224 against the stack. Each arm 224 has an upward extension 236, and upon each movement of cross-bar 194 to the right (in FIG. 14) the squaring members 224 are momentarily withdrawn by the action of cam and roller means 238, 240. Each such movement of cross-bar 194 occurs simultaneously with withdrawal of lower supporting plates 184 and 186, which causes a group of tiles to be dropped. Hence, these pusher members 224 move aside while groups of tiles are being dropped, and immediately thereafter they return inwardly to bear against the edges of the tiles to bring them into vertically aligned, squared relation.

Provision is also made to move the squaring members 224 completely out of the way during operation of pusher 176 to remove a completed stack. Connected to pusher 176 at each side thereof is a flat member 242 having a roller 246 rotatably mounted in a recess 244. Upon outward movement of members 242 together with pusher 176, the rollers 246 engage the lower arms 248 to effect swinging of the squaring bars 224 completely out of the way of discharge of the stack.

Figure 20:
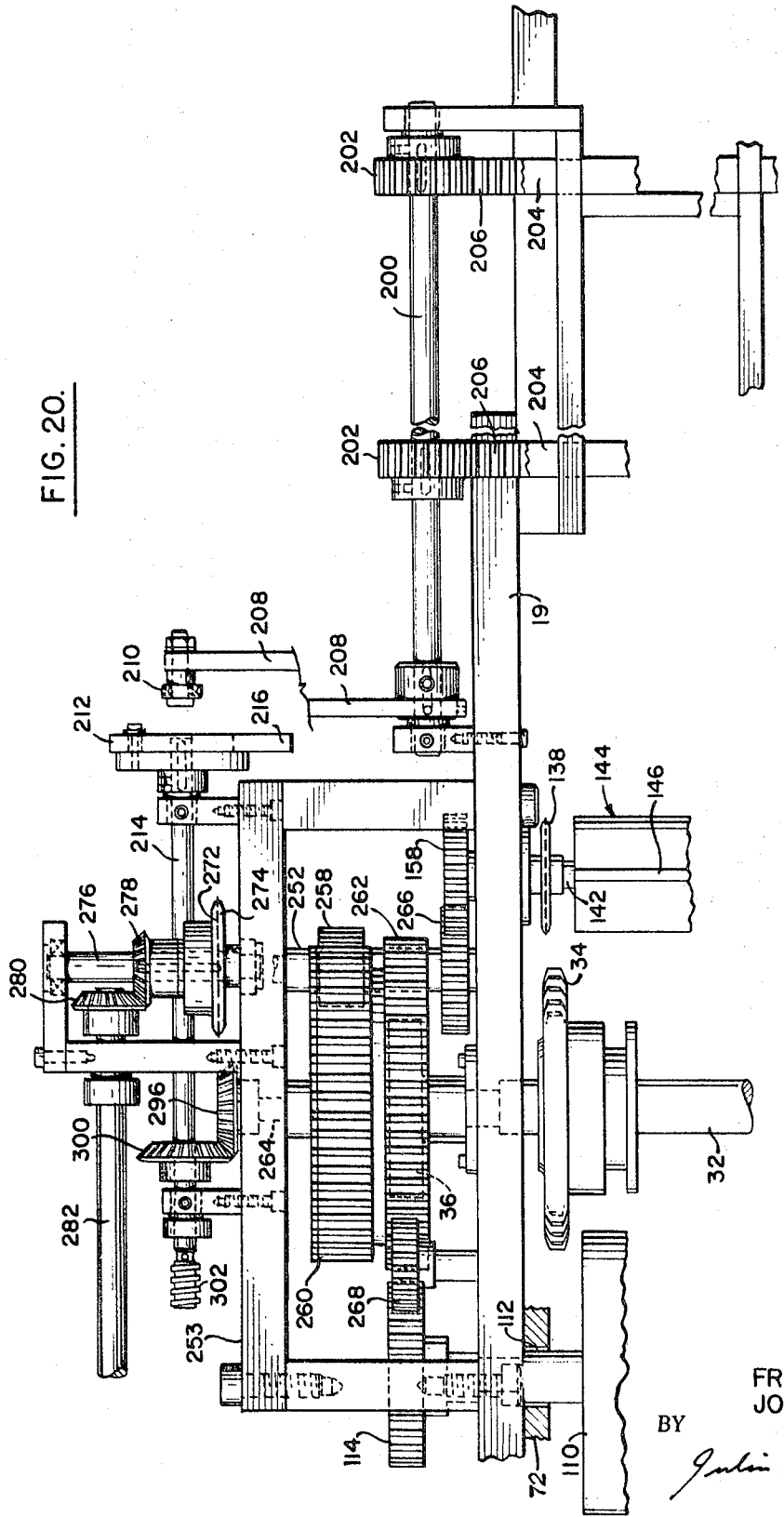
FIG. 20 is a partial plan view of the main drive transmission box.

The overall driving transmission for this entire machine will be described by reference particularly to FIGS. 18 and 20. This driving transmission is housed in an enclosure 250, the cover of which is removed in FIG. 19. The main shaft is indicated at 252 and is driven from a motor (not shown) through a pulley 254 and belt 256. Shaft 252 is journalled in a mounting plate 253 and in machine main frame plate 19 spaced rearwardly therefrom. Behind frame plate 253, a gear 258 is keyed to shaft 252. On a shaft 264, similarly journalled in frame plates 253 and 19, there is keyed a double set of gears 260 and 262, of which gear 260 meshes with driving gear 258. The gear 114 (previously mentioned) on laminator roll shaft 112 is driven from the gear 262 through an idler 268. The conveyor 2 has its input shaft 32 and gear 36 (previously mentioned) driven through meshing of this gear 36 with the gear 262. It is important to note that the laminator roll 110 and conveyor 2 are both driven from gear 262 so that the peripheral speed of the roll 110 is exactly the same as the speed of travel of tiles carried by the conveyor. A chain drive 270, 272, 274 connects shaft 252 with a shaft 276 journalled in a frame plate 253. Through bevel gearing 278, 280 the shaft 276 drives a shaft 282 which in turn, through chain drive 284, 286, drives the previously mentioned flexible coupling 60 by which the roll 54 is driven. A one-way overriding clutch 288 couples shaft 282 to a shaft 290 which, through the previously mentioned bevel gearing 90, 92, drives the adhesive applicator roll 78. The driving of rolls 78 and 54 also is at a rate exactly equal to the rate of travel of the conveyor 2. Shaft 290 also can be driven through a chain drive 292 from a constantly operating motor 294, although the rate at which it would be thereby driven is less than that at which it is usually driven from the shaft 312. The operation of overriding clutch 288 is such that it drives a shaft 290 when this shaft is turning at less than the speed of shaft 282, but when shaft 282 is idle the clutch 288 permits motor 294 to take over the driving of shaft 290. Thus, when the main drive shaft 252 is not in operation, the glue roll 78 nevertheless continues to rotate within the pan 108. This prevents the drying of adhesive on any part of roll 78 during periods when the machine may be temporarily shut down.

The end of shaft 264 carries a bevel gear 296 which drives a gear 300 on shaft 214. The shaft 214 has been previously mentioned in connection with driving of the stacker mechanism's cam 212. The stacker, therefore, is directly operated in synchronism from the shaft 264, from which both the laminating roll 110 and conveyor 2 also are driven. Shaft 214 also drives a worm 302 which meshes with a worm gear 304. This worm gear drives a cam 306 having a lobe 305 adapted to actuate the arm 308 of a solenoid air valve 310. Worm 302 also drives a worm gear 312 on a shaft 314 which carries a cam 316 having a lobe 318. This lobe is adapted to actuate the arm 320 of a solenoid air valve 322. In operation, by means of a switch (not shown) either the unit 322 or 310 is put in operation. Cams 316 and 306 are identical, except that the ratios between worm 302 and worm gear 304 and 312, respectively, are such that one cam will complete one revolution for every 48 tiles and the other will complete one revolution for every 80 tiles. Each of the units 322 and 310 is adapted to initiate operation of the piston and cylinder unit 178, thereto to discharge a stack of tiles from the machine. Thus, by selection of gearing, the stacking section 14 is provided with alternate selection of the numbers of tiles to be assembled in each bundle or stack.

MODIFIED EMBODIMENT

An alternate version of the machine and method according to this invention will now be described with reference to FIGS. 24 to 36. In this alternate embodiment, the basic elements of the previously described machine are employed, i.e., the conveyor, laminating cylinder, cutting mechanism and stacking section. Therefore, only the parts that are added or substituted in the basic machine frame work will be described in detail.

The essential difference between the method now to be described and that previously described is that adhesive is transferred to the tile as a non-liquid film rather than in the wet state. In the method previously described, adhesive was applied to carefully limited areas of a special transfer paper in the wet state. Because of the slippery effect of the liquid adhesive on the superimposed tile and transfer paper, an area of the tile was preconditioned to effect accelerated setting of the adhesive over that area. In the modified or alternate approach herein taken the transfer paper is uniformly coated with a non-liquid adhesive film, and adhesive is carefully removed from this transfer paper in transverse areas which will extend inwardly of the ends of the tile. As discussed in the introduction to this application, it is important that adhesive should not be applied closer than 1/16 to 1/8 inch from the edges of the tile on all sides. At the sides of the tiles, as they are advanced along the conveyor, this is simply accomplished by virtue of the fact that the overall width of the dry adhesive coated transfer paper is 1/8 to 1/4 inch less than the width of the (square) tile. The strips of adhesive which are easily lifted from the areas which traverse the gaps between the ends of the tiles are transferred to a more retentive, disposable wastepaper as will be described hereafter.

As shown in FIGS. 25, 27 and 28, the previously described front and back frameplates 17 and 19, respectively, the conveyor 2, laminating roll 110 and transfer paper roll at and arms 72 remain the same. The roll 54, for applying an adhesive-setting agent, and the complete adhesive applicator assembly 8 are removed. A first pair of arms 400 (FIG. 26) is added to accommodate a roll 403 of used pickup paper. A disc (not shown) on the arm 400 at the far side of the machine is frictionally engageable with the roll 403, and is driven by a speed reduction drive train 404, 406, 408, 410 from a sprocket 411. At 402 there is generally indicated a brake mechanism on the front arm 400 having a hand knob 412 whereby the pull on the pickup paper exerted through the frictional driving disc can be varied. A second pair of arms 414 is added, each arm having a saddle 415 to accommodate the spindle of a roll 417 of unused pickup paper. Each arm 414 also has at its inner side a rotatable rod 413 which is biased against the sides of roll 417 to exert a braking action thereon. The arms 400 and 414 at each side are integrally formed and are supported by mounting them on the arms 72 by means of screws 419.

The transfer paper comprises a silicone surface treated, polyethylene-coated kraft paper, about #60, and for reasons discussed hereafter its roll width is less than the standard 9 inch width of the tiles by at least 1/16 inch and preferably 1/8 to 1/4 inch. On one side of this transfer paper is a non-liquid layer of adhesive of the type which, when applied to tile, will subsequently be effective to bond the tile on a floor surface to which it is applied. The thickness of the layer of adhesive is preferably within the range of .002 to .003 inch. The silicone surface of the transfer paper is characterized in that the adhesive has a low retention to it, and if the adhesive is subjected to contact with a surface to which it has much greater affinity it can readily be lifted or peeled from the transfer paper. Although there are many known pressure-sensitive adhesives which may be applied to the transfer paper and dried thereon, it is generally preferable to use a solvent based adhesive since the liquid can be removed from the adhesive after it is applied to the transfer paper without the need to apply heat that might damage the paper. The "pickup paper," unlike the transfer paper, is an inexpensive low grade of paper having a surface with a considerably higher degree of attraction to the adhesive coating than does the transfer paper. This paper is discarded as waste after it has served to remove strips of adhesive peeled or lifted from the transfer paper.

As the dry adhesive-coated transfer paper is drawn off a roll on arms 72 it passes around a Teflon roll 405 which has integrally molded circumferential ribs 426 and end flanges 424. Roll 405 rotates in bearings 409 mounted on a spindle 407 which is received in mounts 416 and 418, the latter incorporating an adjustment 422 to achieve proper tracking of the web. The adhesive coated transfer paper then, after leaving roller 405, passes over the laminating roll 110 with the adhesive-coated side facing radially outwardly from the laminating roll. Adjacent this path of travel is a cutting cylinder 428, the function of which is to form spaced slits extending to slightly deeper than and beyond the layer of adhesive coating on the transfer paper. (This depth of cutting will be illustrated more fully hereafter by referring to FIG. 34.) The rotation of cutting cylinder 428 is timed with that of laminating cylinder 110 so that the pairs of slits are produced at center-to-center distances along the transfer paper web corresponding to the center-to-center distances of tiles travelling along conveyor 2. Referring specifically to FIGS. 27 and 28, cylinder 428 is keyed to a driving shaft 430. Shaft 430 is journalled at the front of the machine in a bearing 432 which is mounted in a special bracket 434, and at the rearward side of the machine it is journalled in a bearing 436 mounted in rear frame plate 19. A collar 438 is pinned to the shaft 430 and is bolted to cylinder 428, thereby keying the cylinder to the shaft. Referring to the cross-sectional view shown in FIG. 29, the cylinder has milled in its circumference a longitudinally extending channel 440. Because of very small tolerances to which the cutting cylinder must function in cutting through the adhesive coating on the transfer paper, special means are employed for mounting the cutting blades in the cylinder. Each blade 444 is mounted in a blade holder 442. A retainer strip 446 overlies the blade, and a plurality of machine screws 452 extend through strip 446 and blade 444 to secure them to the blade holder 442. The exact radial setting of each blade holder 442 (with its associated blade 444) is determined by a set screw 448, the bottom ends of which engage the bottom of channel 440. After this setting has been established, the blade holder is fixed by bolts 450 extending into the cylinder drums 428. With the cutting cylinder and blade holder arrangement just described the depth of cut into the adhesive coated transfer paper can be governed within tolerances measured in ten thousandths of an inch.

FIGS. 27 and 28 show the drive train whereby cutting cylinder 428 is driven. A sprocket 454 on shaft 430 is driven from a sprocket 456 by a chain 458. The sprocket is keyed on a common shaft 460 with a gear 462 which meshes with the previously described gear 260. The knife blades 444, therefore, are driven in precisely timed relation to the peripheral speed of the laminating cylinder 110.

An important component of this machine is a carriage assembly which is housed in front and rear frames 466 and 468, respectively. Frames 466 and 468 are rigidly connected by a hollow sleeve 472 containing end bearings 474, which receive a drive shaft 470. Shaft 470 rotates in bearings 476, mounted in a bracket 478 at the front of the machine, and in bearings 480 mounted in the rear frameplate 19. In operation, this entire carriage oscillates about the axis of shaft 470. The carriage is in an innermost position relative to laminating cylinder 110, but for purposes of inspection and for threading pickup paper through the rolls, a toggle mechanism generally identified at 481 is provided. A shaft 482 connects the plates 466 and 468. At each end of shaft 42, it carries a yoke 484 to which is secured a bolt 486. One end of each bolt 486 passes through a bore 492 in a cross bar 494, and a compression coil spring 488 acting between the bar 494 and a nut 490 normally urges the carriage frames 466, 468 in the direction of the laminating roller 110. Bar 494 forms the crank of the toggle mechanism, in that it is mounted on arms 496 extending from a shaft 498. By rotating a handle 500 on a shaft 498 in a clockwise direction (FIG. 25) the bar 494 is brought slightly past dead center of the axis of bolts 486, thereby to move the carriage to its operative inward position. Shaft 482 also serves to mount bearings 502, on which a roll 504 turns freely.

One of the key functions in this method and apparatus is performed by a "pickup roll" 506. As evident in FIG. 31, pickup roll 506 is keyed to a shaft 508 which is journalled in bearings 510 in the respective carriage frames 466 and 468. Shaft 508 is driven intermittently from shaft 470 through chain drive 512, 514, 516. The function of pickup roll 506 is to press a pickup paper against the adhesive coating on the transfer paper to attract and remove a strip of this adhesive coating between the slits previously cut by the cutting cylinder knives 444. The pressing of pickup paper against the adhesive coating occurs along essentially a line contact area defined by each of four lobes 518. As shown in cross-sectional view (FIG. 32) each lobe comprises a circular piece of rubber embedded in a channel in the roll 506. If, for example, the width of the adhesive strip to be removed is approximately a quarter inch wide, then the diameter of the rubber strip 518 also is roughly ¼ inch. It will be understood that the purpose of lobes 518 is to apply pressure against the back of the pickup paper along a relatively concentrated area.

Prior to passing around pickup roll 506, the pickup paper passes beneath a roll 520. Roll 520 turns freely on a shaft 524 which is supported between a pair of arms 522, each of which is pivotally mounted on a stud 531 in its associated plate 466 or 468. An elongate opening 526 in each of these plates provides a track permitting free swinging movement of the upper end of each arm 522. The arms 522 are biased toward pickup roll 506 by helical compression coil springs 528. To permit threading of pickup paper through the rolls, however, it is necessary to pull roll 520 out of contact with pickup roll 506. For this purpose, on shaft 524 there is provided a latching lever 530. The end 532 of lever 530 can be swung around to engage a detent 534 cut in a cam 536 which is stationarily mounted on the front frame plate 466. This motion, which is performed by manual operation of a knob 538, withdraws roll 520 away from the roll 506 and holds it in such position.

A roll 540, similar to roll 520, is carried by a shaft 246 mounted on arms 542. Levers 542 are pivotally mounted on studs 544 in their respective frame plates 466 and 468. Levers 542 travel in tracks 548 and are urged in the direction of pickup roll 506 by helical compression coil springs 550. Roll 540 can be withdrawn away from pickup roll 506, for purposes of initially threading the pickup paper, by means of a latch 552 having an end 554 which can be swung into engagement with a second detent 556 in cam 536. This operation of latch 552 to withdraw roll 540 is effected manually by means of a knob 558.

The pickup roll 506 is rotated intermittently to bring a lobe 518 into a position to press a narrow portion of pickup paper against the adhesive-coated side of the transfer paper. The entire carriage structure which carries the pickup roll 506 is intermittently oscillated about shaft 470 to press the pickup roll against this adhesive coating in timed relation with its intermittent rotation. The means for effecting this oscillation of the carriage are particularly shown in FIGS. 25 and 27. On the upper-rear corner of each of the plates 466, 468 there is mounted a bracket 560. These brackets support a shaft 562 on which an idler roller 564 rotates about bearings 556. At each end of shaft 562 there is also a cam follower roller 568 which rides on one of two cams 572. The cams 572 are keyed to the common shaft 562 which is driven as described hereafter. Each of the cams 572 has a depression 576 therein, and when its associated cam follower roller 568 falls into this depression it allows one of the pickup roll lobes 518 to be thrust momentarily toward the laminator roll 110 under the influence of springs 488. Screws 570 are provided to adjust the relation of each yoke 560 to its respective frameplate 466 or 468.

Intermittent driving of the cams 572 and picking roll 506 is effected through a Geneva drive mechanism which will now be described. The shaft 430, which is driven from the gears 260 and 462 through chain drive 454, 456, 458 carries a gear 578 which meshes with a gear 580 on the continuously driven Geneva drive shaft 582. Keyed to the continuously rotating shaft 582 is Geneva driving wheel 584, which has a driving roller 586. Drive shaft 582 and an intermittently driven Geneva shaft 592 are both journalled in a frame bracket 593. A Geneva wheel 588 is keyed to this shaft 592, and has four cam grooves which the roller 586 engages during every revolution of wheel 584. This drive wheen 584 makes one revolution for the passage of every tile beneath laminating cylinder 110. Therefore, shaft 592 drives the pickup roll 506 (through chain drive 512, 514, 516) one-quarter of a revolution for every such tile. Hence, one lobe 518 is brought into position as shown in FIG. 25, at the proper instant, in time with the travel of tiles beneath the laminating cylinder. The cams 572 on shaft 574 also are driven intermittently from the Geneva-driven shaft 592 by chain drive 594, 596, 598.

The timing of the Geneva mechanism in relation to the operation of the cutting cylinder 428, laminating cylinder 110 and conveyor 2 is critical. After a pair of parallel cuts is made by cylinder 428 through the adhesive coating of the transfer paper, these cuts advance into position opposite the pickup roll 506. As illustrated in FIG. 34 the knives 444 cut to a depth slightly greater than the .002 to .003 inch thickness of adhesive. Cams 572 make one complete revolution during each quarter revolution of Geneva-driven wheel 588. As the pair of cuts in the adhesive coating of the transfer paper approaches the pickup roller 506, the Geneva wheel 588 begins to make a quarter revolution and a lobe 518 moves into position approaching the line between the axis of shaft 508 and the laminating cylinder axis 112. Simultaneously, cams 572 begin to make a complete revolution. Just as a lobe 518 moves into position opposite the travelling strip of adhesive between the pair of cuts, cam follower rollers 558 drop into the respective depressions 576 in cams 572. The immediate effect is to permit the springs 488 to drive a lobe 518 against the pickup paper and this strip of adhesive, followed immediately by withdrawal of the pickup roll 506 as the cam follower rollers 568, is lifted from the depression 576. During this withdrawal, the strip of adhesive between the previously formed cut readily transfers itself from the transfer paper to the pickup paper. The pickup roll 506 continues to advance until a quarter revolution of the Geneva driven wheel 588 has been completed. Strips of adhesive successively removed from the transfer paper adhere to the pickup paper at spaced locations thereof as indicated at 600 (FIGS. 24 and 25), and eventually are wound with the pickup paper about the waste roll 403.

The results of the operation of the machine just described may be generally summarized by way of reference to FIGS. 34, 35 and 36. It should be understood that after the composite tile and paper assembly leaves the laminator roll 110, the transfer paper is severed along lines 602 in exactly the same manner as previously described with reference to FIGS. 23A to E. Also, the subsequent stacking operation is the same as previously described with reference to FIGS. 14 to 18. Because these cutting and stacking operations are unchanged in a machine equipped to operate according to this modified embodiment, their descriptions will not be repeated.

It has previously been explained that for reasons connected with packing the tiles and avoidance of certain problems in laying them on a floor, it is desirable that the adhesive does not reach outwardly all the way to the side edges of the tile. Referring to FIGS. 24 and 35, at two opposite sides this object is attained by using a transfer paper which is narrower than the tile to result in a difference "y," at each side, which is of the order of $\frac{1}{16}$ to ⅛ inch. (FIG. 35 is a bottom view of the composite paper and tile assembly.) Therefore, adhesive is not transferred to the tile within this $\frac{1}{16}$ to ⅛ inch-wide border area at each side.

Referring particularly to FIG. 36, the transfer paper extends beyond the leading and trailing edges of the tiles by the distance $S/2$ (one-half S, the spacing between tiles). The width of each of the strips 600 (FIG. 34) of adhesive peeled from the transfer paper is measured as "x" in FIG. 35, and this width is greater than the spacing S by an amount which results in the adhesive area being set back from the tile edge by a distance "z" (FIG. 36). The overhanging extension of paper ($S/2$) at the two opposite edges is advantageous in that it can be easily grasped to aid in peeling the paper from the tile just prior to laying it on a floor.

It should be noted that the apparatus of this invention may be utilized to apply adhesive and a protective sheet to any relatively rigid rectangular product having one flat surface to which the adhesive and protective sheet are to be applied, and thus the utility of this apparatus is not limited to tile products. Those skilled in the art will readily note that, with certain modifications in the conveying and cutting apparatus which are within the scope of the appended claims, this apparatus can produce many different adhesive backed products.

Various other departures from the specifically disclosed embodiments of the invention can be effected without departing from the scope of the invention, as defined by the following claims:

What is claimed is:

1. Apparatus for the production of adhesive-backed products having at least one relatively flat surface to which the adhesive is applied, comprising conveyor means for advancing said products in closely spaced relation with said flat surfaces in a common horizontal plane, a laminating cylinder transversely positioned directly above said plane, means driving said conveyor and cylinder at the same speed, means for guiding a continuous web to said laminating cylinder, means for applying a liquid adhesive to said web prior to contact with said products, means ahead of said laminating cylinder for applying to said flat surfaces of each said product a selected quantity of a liquid agent over a limited area, said liquid agent in such quantity having the property of accelerating the setting of said adhesive, and means supplying said agent to said last-mentioned applying means, said web being pressed into contact with the flat surfaces of a series of said products, cutting means comprising at least one cutting knife mounted on a knife retaining cylinder beneath the conveyor past the location of said cylinder, said knife retaining cylinder including means driving said knife retaining cylinder in synchronism with said conveyor means and said cylinder, said knife on said knife retaining cylinder being positioned such that upon rotation of said knife retaining cylinder said knife moves into the space between each adjacent pair of said products to sever said web, and means above said conveyor opposite the cutting knife for applying pressure against the web as a backup for the cutting action.

2. Apparatus for the production of adhesive-backed products having at least one relatively flat surface to which adhesive is applied, comprising conveyor means for advancing said products in closely spaced relation with said flat surfaces in a common horizontal plane, a laminating cylinder transversely positioned directly above said plane, means driving said conveyor and cylinder at the same speed, means for guiding an adhesive-coated continuous web to said laminating cylinder, said web having its underside covered with a layer of substantially dried, pressure-sensitive adhesive, means along the path of delivery of said web for cutting through said layer to limit and define areas of adhesive to be removed, means engageable with said areas to lift and remove adhesive from the web, said laminating cylinder being adapted to press said adhesive-coated web into contact with the flat surfaces of a series of said products, cutting means having a cutting knife beneath the conveyor past the location of said cylinder, said knife being movable into the space between each adjacent pair of said products to sever said web, means driving said knife in synchronism with the arrival thereat of the spaces between adjacent tiles, and means above said conveyor opposite the cutting knife for applying pressure against the web as a backup for the cutting action.

3. Apparatus according to claim 2, wherein said cutting means comprises a pair of knives for cutting a pair of transverse cuts to define a narrow transverse area, each such area being spaced the same as the center-to-center distance of the conveyed tiles.

4. Apparatus according to claim 3, wherein each said narrow transverse area comprises a strip having a width greater than the spacing between adjacent tiles on said conveyor.

5. Apparatus according to claim 2, wherein said means for lifting and removing areas of adhesive comprises means for guiding and intermittently advancing a web of paper material to which said adhesive has a greater affinity than to its associated web, and means for momentarily pressing said paper against said limited areas of adhesive to be removed.

6. Apparatus for the production of adhesive-backed tile products comprising a conveyor having a plurality of evenly spaced pusher elements for advancing tiles successively in closely spaced relation, a source of continuous web material carrying a uniform coating of substantially dried pressure-sensitive adhesive, a laminating cylinder transversely positioned directly adjacent said conveyor for pressing said web against a series of said tiles, means adjacent the path of delivery of the web to the tiles for cutting through said adhesive coating to define the areas desired to be removed from the web, and means for contacting said areas to lift and remove same from the web.

7. Apparatus according to claim 6, wherein said cutting means comprises a pair of parallel knife elements having a spacing at least as great as the spacing of tiles being conveyed, and means bringing said knives into cutting engagement with the web at intervals corresponding to the center-to-center spacing of said tiles.

8. Apparatus according to claim 6, wherein the last-recited means therein comprises a web of paper to which the adhesive will readily be attracted, means for guiding and intermittently advancing said paper web, and means for momentarily pressing consecutively advanced sections of said paper into contact with said limited areas of adhesive to be removed.

9. Apparatus according to claim 8, wherein the last-mentioned means comprises a roller parallel to the laminating cylinder and having a plurality of circumferentially spaced axially extending lobes, a carriage mounting said roller for movement thereof against said web as it travels around said cylinder, means periodically driving said carriage toward and away from said cylinder to bring one of said lobes momentarily into engagement with one of said areas in synchronism with its travel, and means thereafter rotating said roller to advance said paper web and another lobe into readiness for a subsequent driving motion against the adhesive-coated side of the web.

References Cited

UNITED STATES PATENTS

| | | | |
|---|---|---|---|
| 2,991,214 | 7/1961 | Burkholder | 156—552X |
| 2,895,551 | 7/1959 | Anderson et al. | 83—346X |

FOREIGN PATENTS

| | | | |
|---|---|---|---|
| 814,201 | 6/1959 | Great Britain | 156—314 |

ROBERT F. BURNETT, Primary Examiner

R. O. LINKER, Jr., Assistant Examiner

U.S. Cl. X.R.

156—234, 235, 248, 249, 250, 302, 316, 522, 540 543, 548, 552, 555, 562, 564, 566, 570, 572, 578, 584